United States Patent
Kim et al.

(10) Patent No.: US 11,067,089 B2
(45) Date of Patent: Jul. 20, 2021

(54) FLOW GENERATOR

(71) Applicant: LG ELECTRONICS INC., Seoul (KR)

(72) Inventors: Yongmin Kim, Seoul (KR); Dongryul Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/640,123

(22) PCT Filed: May 17, 2018

(86) PCT No.: PCT/KR2018/005681
§ 371 (c)(1),
(2) Date: Feb. 19, 2020

(87) PCT Pub. No.: WO2019/045226
PCT Pub. Date: Mar. 7, 2019

(65) Prior Publication Data
US 2021/0190083 A1 Jun. 24, 2021

(30) Foreign Application Priority Data

Sep. 1, 2017 (KR) .......................... 10-2017-0112090

(51) Int. Cl.
*F04D 13/14* (2006.01)
*F04D 25/16* (2006.01)
(Continued)

(52) U.S. Cl.
CPC ........... *F04D 25/166* (2013.01); *F04D 25/06* (2013.01); *F04D 27/004* (2013.01);
(Continued)

(58) Field of Classification Search
CPC ...... F04D 25/08; F04D 25/166; F04D 27/004; F04D 29/4226; F04D 29/441; F05D 2270/02
See application file for complete search history.

(56) References Cited

U.S. PATENT DOCUMENTS 4,738,188 A * 4/1988 Nishida ................ F24F 11/0001
454/229
5,258,676 A * 11/1993 Reinhardt ........... F04D 25/0613
310/112
(Continued)

FOREIGN PATENT DOCUMENTS

EP 3 460 250 A1 3/2019
JP 2012-229657 11/2012
(Continued)

OTHER PUBLICATIONS

International Search Report dated Aug. 30, 2018 issued in Application No. PCT/KR2018/005681.
(Continued)

*Primary Examiner* — Ninh H. Nguyen
(74) *Attorney, Agent, or Firm* — KED & Associates LLP

(57) ABSTRACT

A flow generator according to an embodiment of the present invention includes an upper fan configured to suction upper air and generate a first airflow, an upper fan housing configured to accommodate the upper fan from a lower side thereof and comprising a first discharge part through which the suctioned upper air is discharged, a lower fan configured to suction lower air and generate a second airflow, a lower fan housing configured to accommodate the lower fan from an upper side thereof and comprising a second discharge part through which the suctioned lower air is discharged, an air guide disposed between the upper fan and the lower fan to guide generation of a third airflow in which the first airflow and the second airflow are mixed with each other, and a
(Continued)

control unit configured to control a rotational speed of the lower fan or the upper fan to adjust a discharge direction of the third airflow, wherein the first discharge part is disposed to face the second discharge part with respect to the flow guide part.

20 Claims, 36 Drawing Sheets

(51) Int. Cl.
    *F04D 29/44*     (2006.01)
    *F04D 25/06*     (2006.01)
    *F04D 27/00*     (2006.01)
    *F04D 29/42*     (2006.01)

(52) U.S. Cl.
    CPC ....... *F04D 29/4226* (2013.01); *F04D 29/441* (2013.01); *F05D 2270/02* (2013.01)

(56) References Cited

U.S. PATENT DOCUMENTS

| | | | |
|---|---|---|---|
| 9,759,219 B2 * | 9/2017 | Tiainen | F04D 25/166 |
| 10,337,523 B2 * | 7/2019 | Chou | F04D 25/0606 |
| 2012/0275915 A1 | 11/2012 | Konishi et al. | |
| 2017/0089605 A1 | 3/2017 | Kim et al. | |

FOREIGN PATENT DOCUMENTS

| | | |
|---|---|---|
| KR | 20-1986-0013533 | 11/1986 |
| KR | 10-2000-0055145 | 9/2000 |
| KR | 10-2001-0036050 A | 5/2001 |
| KR | 20-0278255 | 6/2002 |
| KR | 10-0379992 | 4/2003 |
| KR | 10-2008-0087365 | 10/2008 |
| KR | 10-0919317 | 10/2009 |
| KR | 10-2012-0022248 A | 3/2012 |
| KR | 10-2012-0049182 | 5/2012 |
| KR | 10-2016-0034058 | 3/2016 |

OTHER PUBLICATIONS

Korean Office Action dated Feb. 20, 2021 issued in Application No. 10-2020-7009045.

Extended European Search Report dated Mar. 29, 2021 issued in Application EP 18 85 2180.

* cited by examiner

FLOW GENERATOR

CROSS-REFERENCE TO RELATED PATENT APPLICATIONS

This application is a U.S. National Stage Application under 35 U.S.C. § 371 of PCT Application No. PCT/KR2018/005681, filed May 17, 2018, which claims priority to Korean Patent Application No. 10-2017-0112090, filed Sep. 1, 2017, whose entire disclosures are hereby incorporated by reference.

TECHNICAL FIELD

Embodiments of the present invention relate to a flow generator.

BACKGROUND ART

Generally, a flow generator is understood as a device for driving a fan to generate an air flow and blowing the generated air flow to a position desired by a user. The flow generator is usually called a "fan". Such a flow generator may be mainly disposed in an indoor space such as a home or office and be used to provide cool and pleasant feeling to a user in hot weather such as summer.

With respect to this flow generator, techniques of the following prior art document has been proposed in the related art.

PRIOR ART DOCUMENT 1

1. Publication Number (Publication Date): 10-2012-0049182 (May 16, 2012)
2. Title of The Invention: Axial Flow Fan

PRIOR ART DOCUMENT 2

1. Publication Number (Publication Date): 10-2008-0087365 (Oct. 1, 2008)
2. Title of The Invention: Electric Fan Each of the devices according to the prior art documents 1 and 2 includes a support placed on the ground, a leg extending upward from the support, and a fan coupled to an upper portion of the leg. The fan may be an axial flow fan. When the fan is driven, air is suctioned from a rear side of the device toward the fan, and the suctioned air passes through the fan and then is discharged to a front side of the device.

According to the prior art documents 1 and 2, the fan is exposed to the outside. In the device according to the prior art document 1, although a safety cover surrounding the outside of the fan is provided for a reason of safety, there is still a concern that a user's finger passes through the safety cover to touch the fan. Also, if a large amount of dust exists in a space in which the device is placed, there is a problem that the dust is easily accumulated in the fan through the safety cover, and thus, the device becomes easily dirty.

Also, in the devices according to the prior art documents 1 and 2, in terms of simply generating an air flow to be supplied to the user, if the device is used in a space with a high degree of contamination, the user's health may be deteriorated.

In addition, in an environment in which a temperature of an installation space is somewhat low in winter, the use of the devices according to the prior art documents 1 and 2 are not necessary, and thus, the device should be stored until the summer of next year. As a result, there is a problem that the usability of the device is deteriorated.

DISCLOSURE OF THE INVENTION

Technical Problem

To solve the above problem, an object of an embodiment of the present invention is to provide a flow generator that is capable of discharging air-conditioned or purified air.

Also, an object of an embodiment of the present invention is to provide a flow generator in which air treated in the upper module and the lower module is mixed with each other while being discharged.

Also, an object of an embodiment of the present invention is to provide a flow generator in which a fan is not exposed to the outside.

Also, an object of an embodiment of the present invention is to provide a flow generator in which air suctioned into each of upper and lower portions thereof is capable of being discharged through a central portion thereof.

Also, an object of an embodiment of the present invention is to provide a flow generator in which air discharged through each of an upper module and a lower module is easily discharged in a radial direction.

Also, an object of an embodiment of the present invention is to provide a flow generator in which an upper module and a lower module rotate together to discharge air in various directions.

Also, an object of an embodiment of the present invention is to provide a flow generator in which the number or revolution of an upper or lower fan motor is adjusted through a control unit to adjust a vertical direction of a third airflow because it is unnecessary to allow a user to manually manipulate a main body so as to discharge air upward or downward.

Also, an object of an embodiment of the present invention is to provide a flow generator in which air reciprocates in a vertical direction so as to be discharged.

Also, an object of an embodiment of the present invention is to provide a flow generator in which an exposed area of a fan, through which internal air flows, to the outside is minimized to provide a neat appearance without accumulation of dust on the fan.

Also, an object of an embodiment of the present invention is to provide a flow generator for solving a problem in which a user feels an artificial airflow far from the natural wind due to an artificial factor for forcing a flow of air in a natural wind mode provided in an axial flow fan according to the related art.

Also, an object of an embodiment of the present invention is to provide a flow generator for solving a disadvantage in which rotation of a device itself and a change in revolution number (RPM) of a blade are essentially performed to change a discharged airflow in a natural wind mode provided by a conventional fan.

Also, an object of an embodiment of the present invention is to provide a flow generator capable of solving an airflow generation problem that gives a sense of heterogeneity in a natural wind mode to a user.

Also, an object of an embodiment of the present invention is to provide a flow generator in which natural wind characteristics are reflected to be provided to a user.

Technical Solution

To achieve the above objects, a flow generator according to an embodiment of the present invention includes an upper fan configured to suction upper air and generate a first airflow, an upper fan housing configured to accommodate the upper fan from a lower side thereof and comprising a first discharge part through which the suctioned upper air is discharged, a lower fan configured to suction lower air and generate a second airflow, a lower fan housing configured to accommodate the lower fan from an upper side thereof and comprising a second discharge part through which the suctioned lower air is discharged, an air guide disposed between the upper fan and the lower fan to guide generation of a third airflow in which the first airflow and the second airflow are mixed with each other, and a control unit configured to control a rotational speed of the lower fan or the upper fan to adjust a discharge direction of the third airflow, wherein the first discharge part is disposed to face the second discharge part with respect to the flow guide part.

Also, the control unit may control the rotational speed of the lower fan or the upper fan so that a flow rate of air passing through the second discharge part is greater than that of air passing through the first discharge part to allow the third airflow to flow toward an upper side of the air guide.

Also, the control unit may control the rotational speed of the lower fan or the upper fan so that a flow rate of air passing through the first discharge part is greater than that of air passing through the second discharge part to allow the third airflow to flow toward a lower side of the air guide.

Also, the flow generator may further include an orifice disposed below the lower fan housing; and a rotary motor installed in the orifice to provide driving force, wherein the first discharge part and the second discharge part may be rotatable by the driving of the rotary motor.

Also, the flow generator may further include an upper motor connected to the upper fan; and a lower motor connected to the lower fan, wherein the control unit may control the number of revolution of the upper motor or the lower motor to adjust a vertical discharge direction of the third airflow.

Also, the control unit may allow the rotational speed of the upper fan to increase or decrease at a constant rate within a first set range, and the control unit may allow the rotational speed of the lower fan to increase or decrease at a constant rate within a second set range.

Also, the control unit may allow the numbers of revolution of the upper motor and the lower motor to increases or decreases in inverse proportion to each other so that the third airflow is discharged while reciprocating in a vertical direction of the air guide.

Also, the upper fan housing may include a first guide wall which is disposed to be spaced apart from at least a portion of an outer circumferential surface of the upper fan to provide a first fan passage, and the lower fan housing may include a second guide wall which is disposed to be spaced apart from at least a portion of an outer circumferential surface of the lower fan to provide a second fan passage.

Also, each of the first guide wall and the second guide wall may include an inclined part inclinedly extending from a lower end of one side thereof, and each of the first fan passage and the second fan passage may guide air introduced in an axial direction to flow in a circumferential direction.

Also, each of the first fan passage and the second fan passage may have a cross-sectional area that gradually increases in a rotation direction of the air.

Also, air passing through the first discharge part and air passing through the second discharge part may pass through the air guide to collide with each other or to be mixed with each other so as to be provided to a user.

Also, an airflow velocity and airflow distribution may be changed by only changing the revolution number (RPM) of each of the upper fan and the lower fan to provide a three-dimensional and natural discharge airflow to a user.

Advantageous Effects

According to the present invention, since the air flow is generated by the driving of the fan provided in each of the first module and the second module, the amount of discharged air to be supplied to the user may increase.

According to the present invention, the air may be suctioned through the upper and lower portion of the first and second modules to increase in air blowing capacity.

According to the present invention, since the air suctioned into the upper and lower portions of the flow generator is discharged together through the central portion, the discharged air may be increasingly concentrated, and thus, the amount of air to be supplied to the user may increase.

According to the present invention, the air rotating the circumferential direction while passing through the fan may be easily discharged in the radial direction by the air guide device to concentrate the discharged air.

According to the present invention, since the first and second modules discharge the air while rotating, the air may be discharged in the various directions.

According to the present invention, the motor and the power transmission device may be provided in the driving device, and the first and second modules may be coupled to each other to rotate together, and thus, the rotational operation of the flow generator may be realized through the simple structure.

According to the present invention, the number of revolution of the upper or lower fan motor may be adjusted through the control unit to simply adjust the vertical direction of the discharged air.

According to the present invention, the user may discharge the discharged air to reciprocate in the vertical direction to efficiently ventilate or blow the air within the inner space in which the flow generator is installed.

According to the present invention, since the dust is not accumulated on the fan within the flow generator, the neat appearance may be provided.

According to the present invention, the natural feeling that reflects the characteristics of the natural wind may be provided to improve the comfort of the user.

According to the present invention, the artificial factor for forcing the flow direction of the discharge air in the related art may be reduced to provide the wind close to the nature.

According to the present invention, since the rotation of the device itself is unnecessary to provide the natural wind, there is an advantage that the power consumption is relatively reduced.

According to the present invention, since the user may perceive that the portion of the user's body in contact with the discharge airflow is changed, the satisfaction of the user and the reliability of the product may be improved.

BRIEF DESCRIPTION OF THE DRAWINGS

FIG. 29 is a view illustrating a second reciprocating operation of the flow generator according to an embodiment of the present invention.

MODE FOR CARRYING OUT THE INVENTION

Reference will now be made in detail to the embodiments of the present disclosure, examples of which are illustrated in the accompanying drawings. In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

First Embodiment

Figure 1:
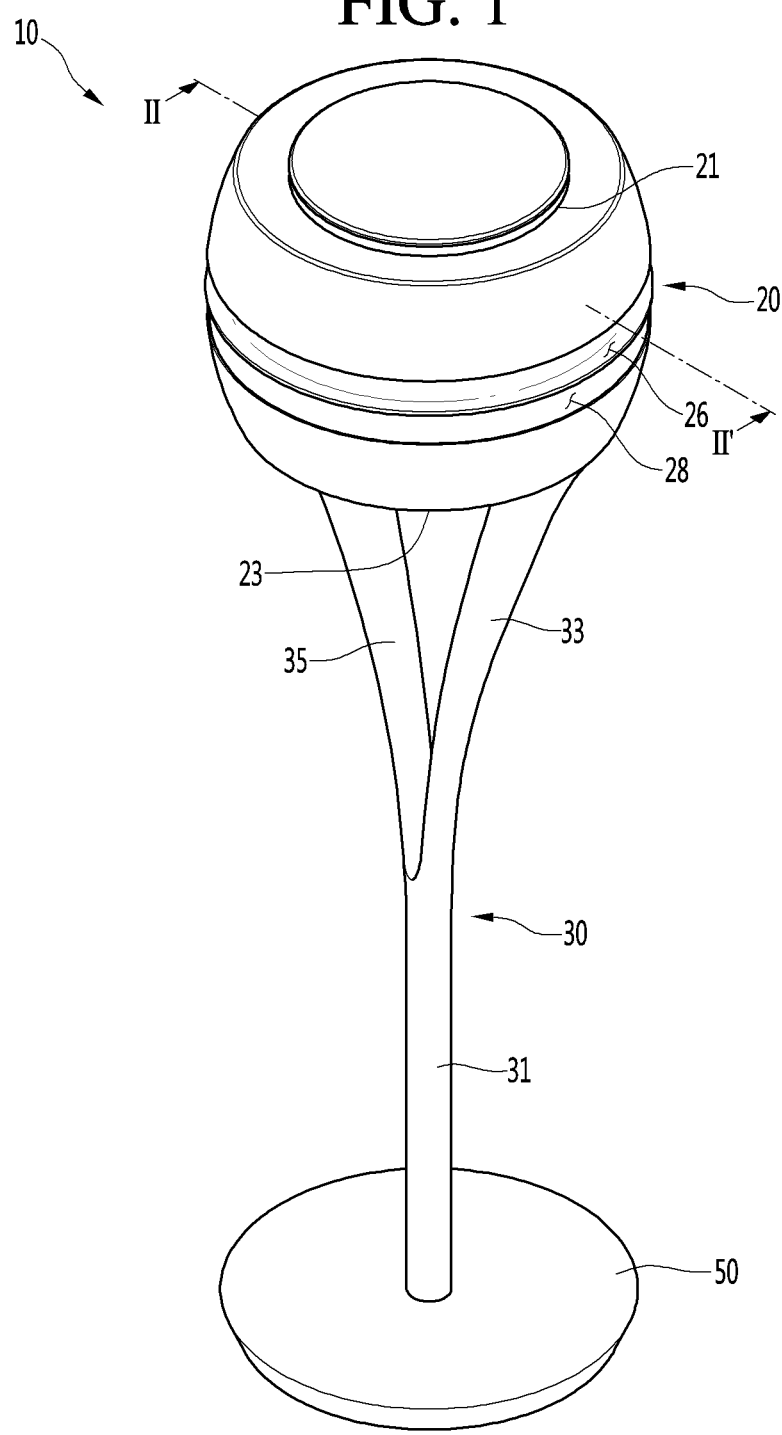
FIG. 1 is a perspective view illustrating a configuration of a flow generator according to a first embodiment of the present invention.
Figure 2:
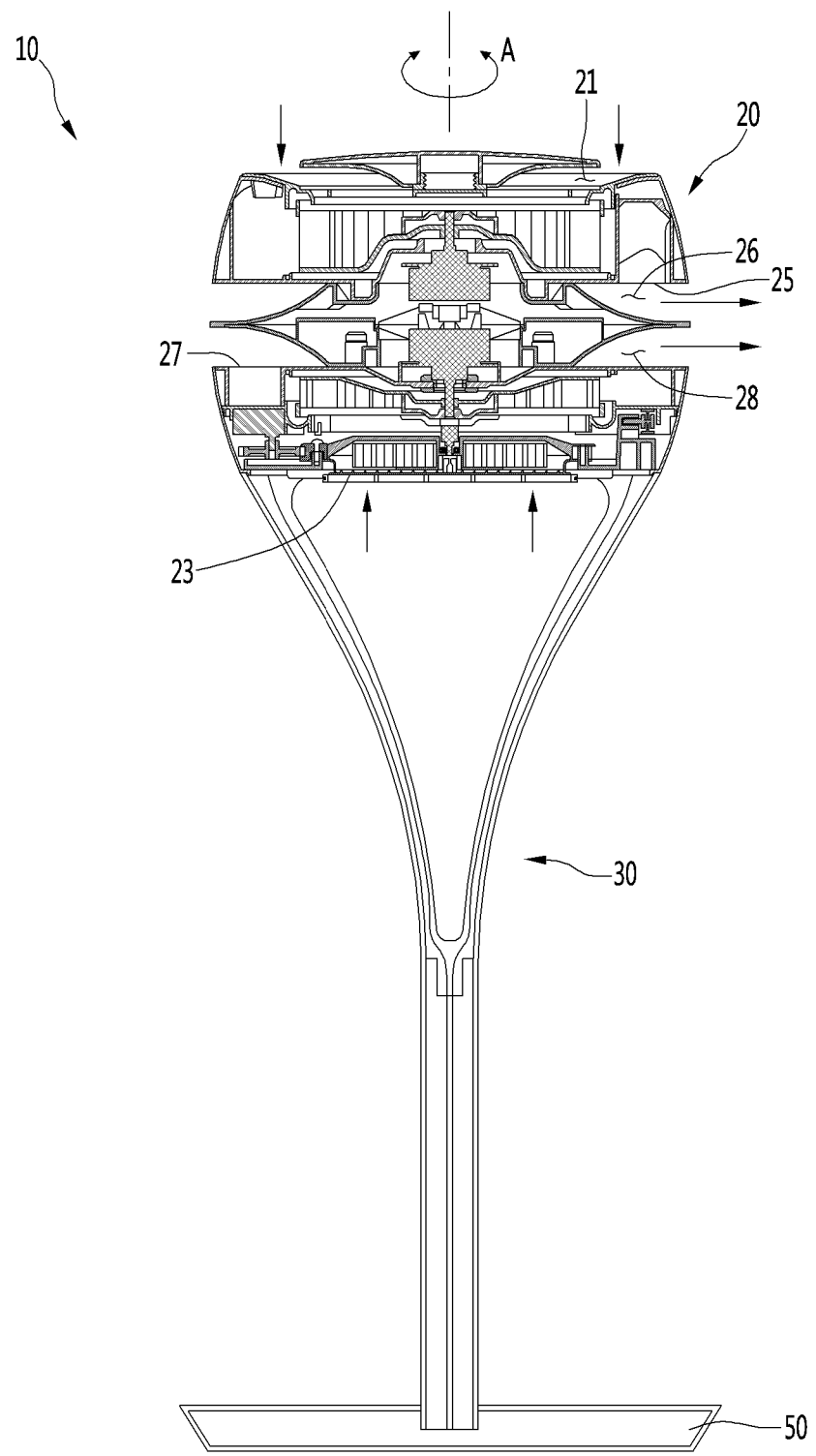
FIG. 2 is a cross-sectional view taken along line II-II' of FIG. 1.

FIG. 1 is a perspective view illustrating a configuration of a flow generator according to a first embodiment of the present invention, and FIG. 2 is a cross-sectional view taken along line II-II' of FIG. 1.

[Main Body]

referring to FIGS. 1 and 2, a flow generator 10 according to an embodiment of the present invention includes a main body 20 including suction parts 21 and 23 through which air is suctioned and discharge parts 25 and 27 through which air is discharged.

[First and Second Suction Parts]

The suction parts 21 and 23 include a first suction part 21 provided in an upper portion of the main body 20 and a second suction part 23 provided in a lower portion of the main body 20. Air suctioned through the first suction part 21 may flow downward to be discharged to a central portion of the main body 21. Also, air suctioned through the second suction part 23 may flow upward to be discharged to a central portion of the main body 21. The "central portion" of the main body 21 may represent a central portion of the main body 21 in a vertical direction.

[First and Second Discharge Parts]

The discharge parts 25 and 27 may be disposed at the central portion of the main body 20. The discharge parts 25 and 27 include a first discharge part 25 through which the air suctioned into the first suction part 21 is discharged and a second discharge part 27 through which the air suctioned into the second suction part 23 is discharged. The first discharge part 25 is disposed above the second discharge part 27.

Also, the first discharge part 25 may discharge the air in a direction of the second discharge part 27, and the second discharge part 27 may discharge the air in a direction of the first discharge part 25. In other words, a first air flow discharged from the first discharge part 25 and a second air flow discharged from the second discharge part 27 may flow to be close to each other.

The air discharged from the first discharge part 25 and the air discharged from the second discharge part 27 may flow in a lateral direction of a radial direction of the main body 20. A passage through which the air discharged from the first discharge part 25 flows is called a "first discharge passage 26", and a passage through which the air discharged from the second discharge part 27 flows is called a "second discharge passage 28". Also, the first and second discharge passages 26 and 28 may be collectively called a "discharge passage".

[Direction Definition]

The direction will be defined. In FIGS. 1 and 2, a longitudinal direction may be referred to as an "axial direction" or "vertical direction", and a transverse direction perpendicular to the axial direction may be referred to as a "radial direction".

[Leg]

The flow generator 10 further includes a leg 30 provided below the main body 20. The leg 30 may extend downward from the main body 20 and be coupled to a base 50. The base 50 may be a component placed on the ground and support the main body 20 and the leg 30.

The leg 30 includes a leg body 31 coupled to the base 50 to extend upward. Also, the leg 30 further includes leg extension parts 33 and 35 extending upward from the leg body 31. The leg extension parts 33 and 35 include a first leg extension part 33 extending from the leg body 31 in one direction and a second leg extension part 35 extending from the leg body 31 in the other direction. The first and second leg extension parts 33 and 35 may be coupled to a lower portion of the main body 20.

For example, the leg body 31 and the first and second leg extension parts 33 and 35 may have a "Y" shape. However, the present invention is not limited to the shape of the leg body 30 and the first and second leg extension parts 33 and 35.

For example, three or more leg extension parts may be provided. Also, the leg extension parts may include a tripod-shaped base.

For another example, the leg extension parts may be omitted, and only the leg body having a straight line shape may be provided.

For further another example, the leg body may be omitted, and a plurality of leg extension parts may extend upward from the base.

<Configuration of Upper Module>

Figure 3:
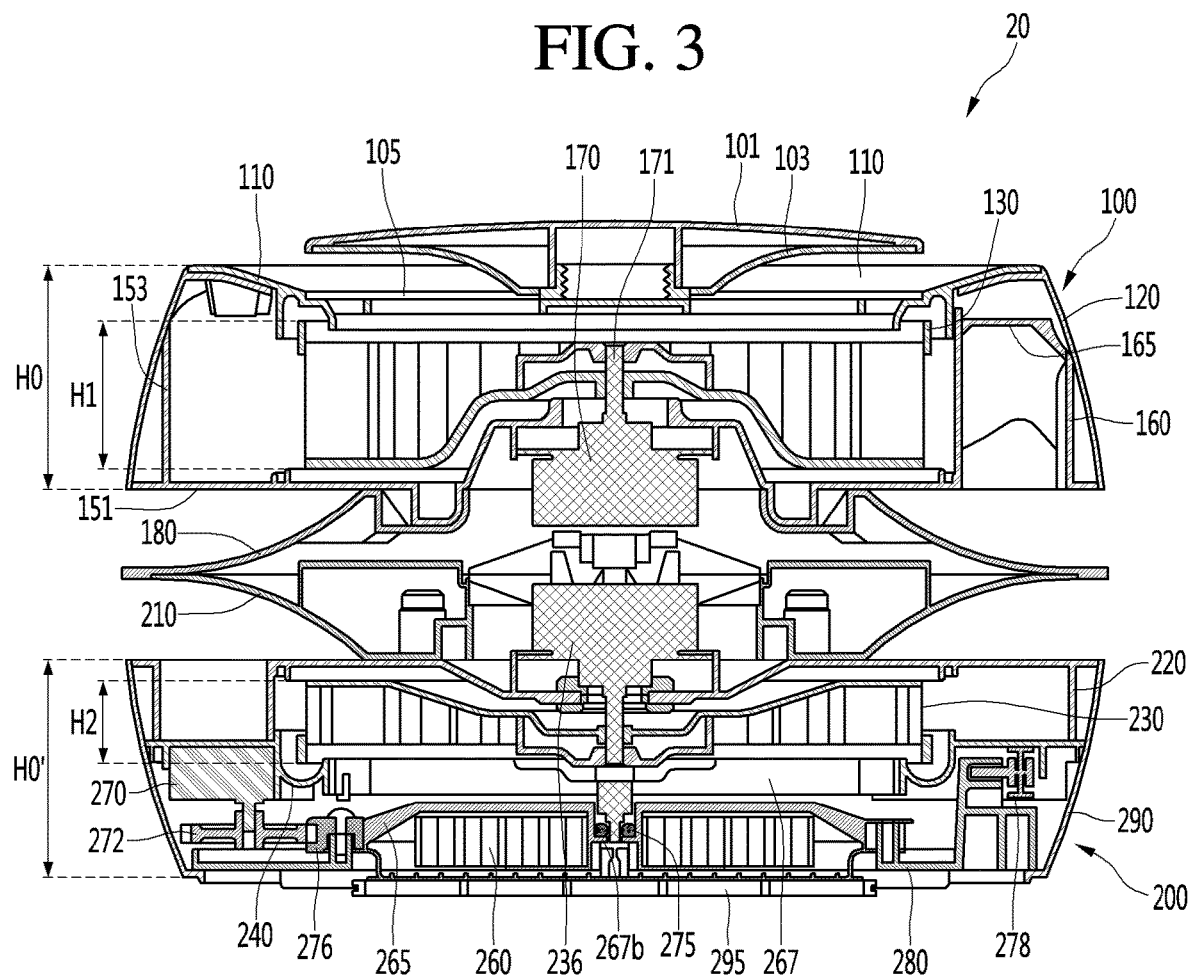
FIG. 3 is a cross-sectional view illustrating a configuration of an upper module and a lower module according to the first embodiment of the present invention.
Figure 4:
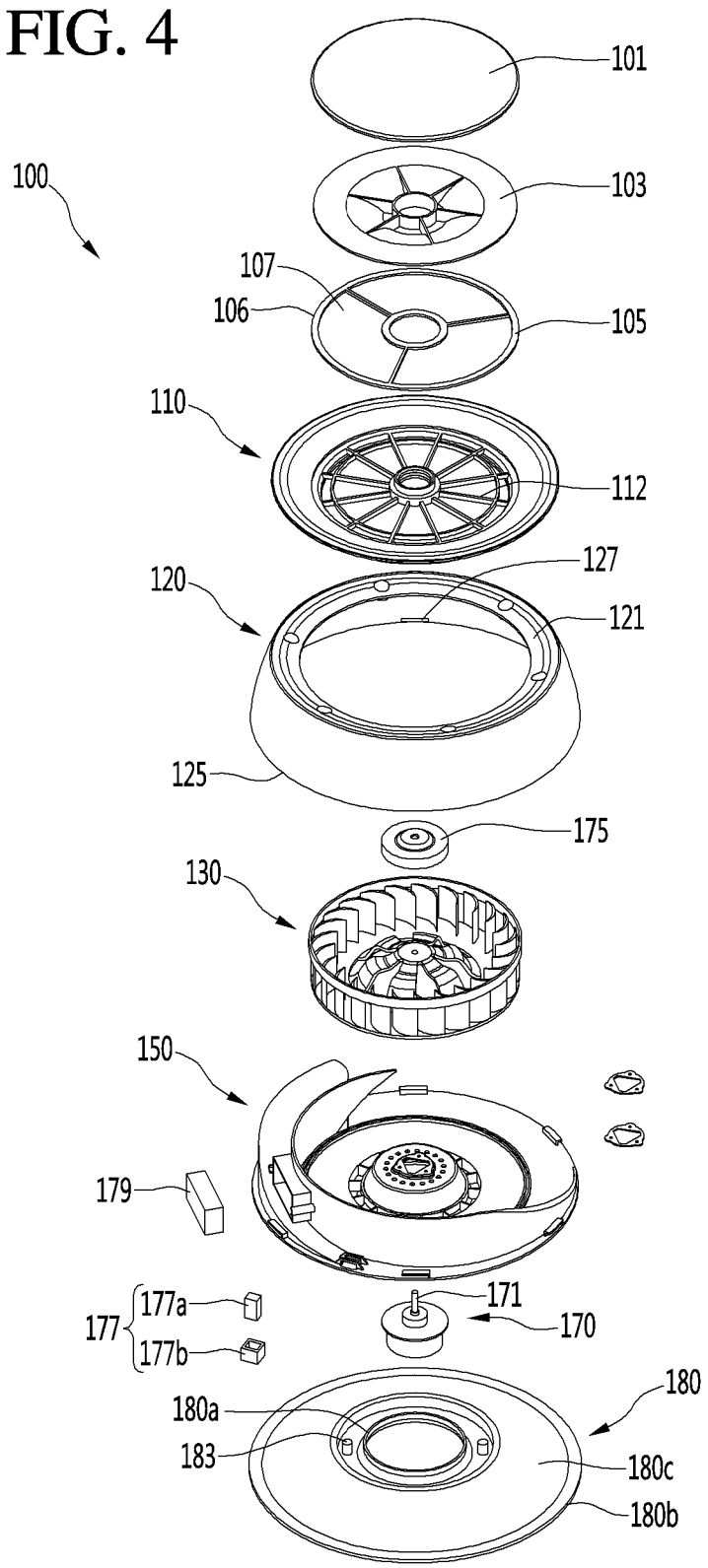
FIG. 4 is an exploded perspective view illustrating a configuration of the upper module according to the first embodiment of the present invention.

FIG. 3 is a cross-sectional view illustrating a configuration of an upper module and a lower module according to the first embodiment of the present invention, and FIG. 4 is an exploded perspective view illustrating a configuration of the upper module according to the first embodiment of the present invention.

Referring to FIGS. 3 and 4, the main body 20 according to an embodiment of the present invention includes an upper module 100 and a lower module 200 disposed below the upper module 100. The upper module 100 and the lower module 200 may be laminated in the vertical direction.

[Upper Fan and Upper Fan Housing]

The upper module includes an upper fan 130 generating an air flow and an upper fan housing 150 in which the upper fan 130 is installed.

The upper fan 130 may include a centrifugal fan that suctions the air in the axial direction and discharges the suctioned air in the radial direction. For example, the upper fan 130 may include a sirocco fan.

The upper fan housing 150 may have a guide structure that supports a lower portion of the upper fan 130 and guides the air flow generated by rotation of the upper fan 130 to the first discharge part 25.

[First Air Treating Device]

A first air treating device operates to air-condition or purify air flowing through the upper module 100 may be provided in the upper fan housing 150. For example, the first air treating device may include an ionizer 179 capable of removing floating microorganisms from the suctioned air.

The ionizer 179 may be installed on an ionizer mounting part 168 provided in the upper fan housing 150. The ionizer mounting part 168 is provided on a guide wall 153. The ionizer 179 may be installed on the ionizer mounting part 168 and exposed to a first fan passage 138a. Thus, the ionizer 179 may act on the air passing through the upper fan 130 to perform a sterilizing function.

[Upper Motor]

The upper module 100 further includes an upper motor 170 connected to the upper fan 130 to provide driving force. An upper motor shaft 171 is provided on the upper motor 170. The upper motor shaft 171 may extend upward from the upper motor 170. Also, the upper motor 170 may be disposed below the upper fan housing 150, and the upper motor shaft 171 may be disposed to pass through the upper fan housing 150 and the upper fan 130.

[Locking Part]

The upper module 100 further includes a locking part 175 coupled to the upper motor shaft 171. The locking part 175 is disposed on a hub 131a of the upper fan 130 to fix the upper motor 170 to the upper fan 130.

[Upper Cover]

The upper module 100 further includes an upper cover 120 disposed to surround the upper fan 130 and the upper fan housing 150. In detail, the upper cover 120 includes a cover inflow part 121 which has an opened upper end and through which the air suctioned through the first suction part 21 is introduced. Also, the upper cover 120 further includes a cover discharge part 125 having an opened lower end. The air passing through the upper fan 130 may flow to the first discharge passage 26 through the cover discharge part 125.

The cover discharge part 125 may have a size greater than that of the cover inflow part 121. Thus, the upper cover 120 may have a truncated conical shape with opened upper and lower ends. Due to this configuration, the air passing through the upper fan 130 may flow to be gradually spread in a circumferential direction and then easily discharged through the first discharge part 25.

[Display Cover]

The upper module 100 further includes a display cover 110 seated on an upper portion of the upper cover 120. The display cover 110 includes a cover grill 112 providing an air passage. The air suctioned through the first suction part 21 may flow downward through an opened space of the cover grill 112.

[First Pre-Filter]

The upper module 100 further includes a first pre-filter 105 supported by the display cover 110. The first pre-filter 105 may include a filter frame 106 and a filter member 107 coupled to the filter frame 106. Foreign substances contained in the air suctioned through the first suction part 21 may be filtered by the first pre-filter 105.

[Top Cover and Top Cover Support]

The upper module 100 further includes a top cover support 103 coupled to an upper portion of the display cover 110 and a top cover 101 placed on the top cover support 103. The top cover support 103 may protrude upward from the display cover 110. It is understood that a space between the top cover support 103 and the display cover 110 provides the first suction part 21.

A central portion of the top cover support 103 may be coupled to a central portion of the display cover 110, and a bottom surface of the top cover support 103 may extend to be rounded from the central portion of the top cover support 103 in the outer radial direction. Due to the configuration of the top cover support 103, the air suctioned through the first suction part 21 may be guide toward a cover grill 112 of the display cover 110 along the bottom surface of the top cover support 103.

An input part through which a user command is inputted may be provided on an upper portion of the top cover 101. Also, a display PCB may be installed in the top cover 101.

[Upper Air Guide]

The upper module 100 further includes an upper air guide 180 provided below the upper fan housing 150 to guide the air passing through the upper fan housing 150 to the first discharge passage 267. The upper air guide 180 is configured to support the upper fan housing 150. Also, the upper fan housing 150 includes a first guide coupling part (see reference numeral 151b of FIG. 6) coupled to the upper air guide 180. A predetermined coupling member may be coupled to a first housing coupling part 183 of the upper air guide 180 through the first guide coupling part 151b.

The upper air guide 180 has a hollow plate shape. In detail, the upper air guide 180 includes a central portion 180a into which the upper motor 170 is inserted, an edge portion 180b defining an outer circumferential surface of the upper air guide 180, and a guide extension part 180c extending from the central portion 180c toward the edge portion 180b in an outer radial direction.

The guide extension part 180c may extend to be inclined downward or rounded downward from the central portion 180 toward the edge portion 180b. Due to this configuration, the air discharged downward from the upper fan housing 150 may easily flow to the outside of the main body 20.

[Detailed Configuration of Upper Fan]

Figure 5:
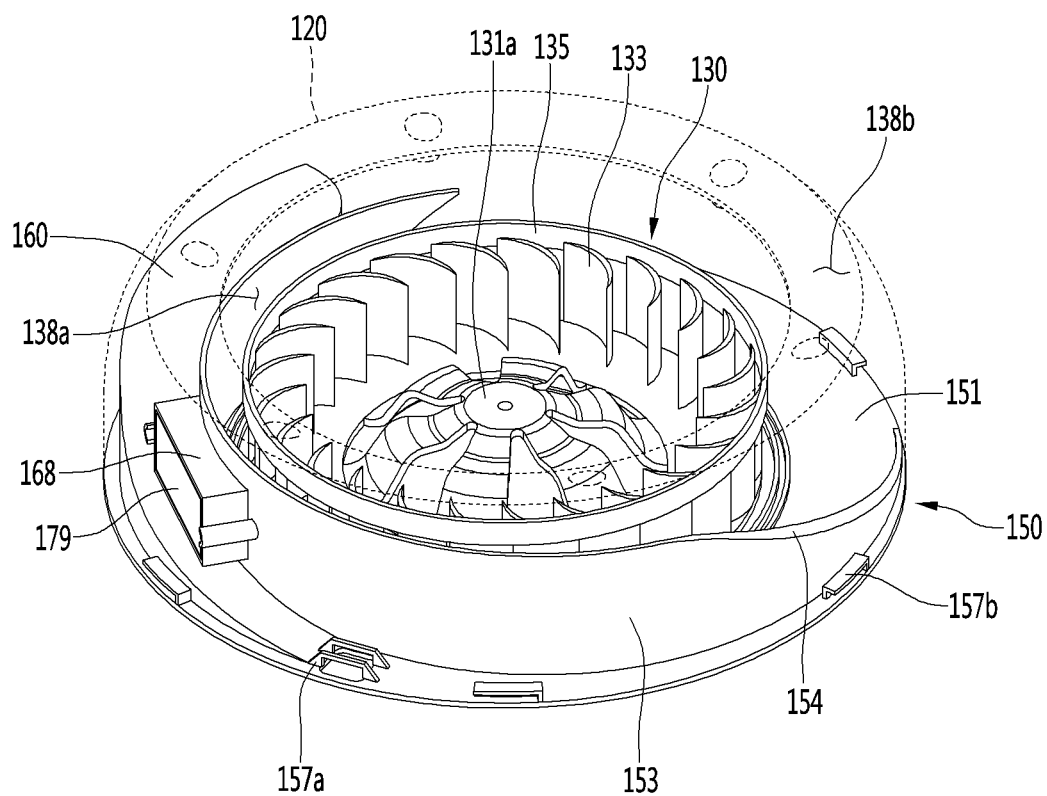
FIG. 5 is a view illustrating a configuration of an upper fan housing and an upper fan according to the first embodiment of the present invention.
Figure 6:
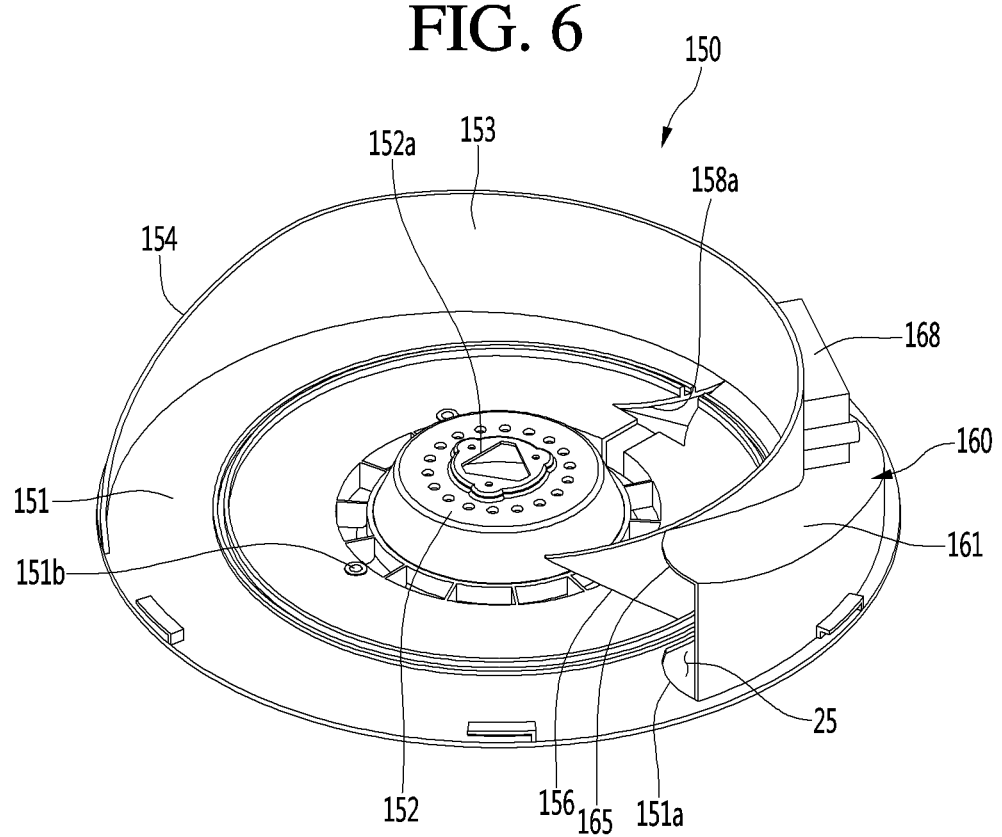
FIG. 6 is a perspective view of a configuration of the upper fan housing according to the first embodiment of the present invention.
Figure 7:
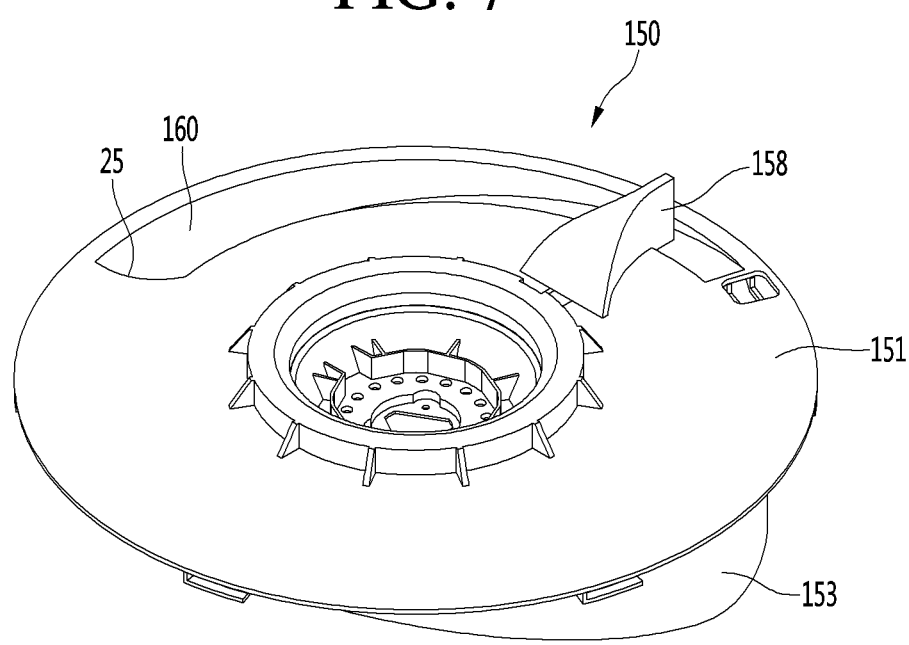
FIG. 7 is a bottom perspective view illustrating the configuration of the upper fan housing according to the first embodiment of the present invention.

FIG. 5 is a view illustrating a configuration of the upper fan housing and the upper fan according to the first embodiment of the present invention, FIG. 6 is a perspective view of a configuration of the upper fan housing according to the first embodiment of the present invention, and FIG. 7 is a bottom perspective view illustrating the configuration of the upper fan housing according to the first embodiment of the present invention.

Referring to FIGS. 5 to 7, the upper module 100 according to an embodiment of the present invention includes the upper fan 130 generating an air flow and the upper fan housing 150 supporting the upper fan 130 and surrounding at least a portion of the outer circumferential surface of the upper fan 130.

The upper fan 130 may have a cylindrical shape as a whole. In detail, the upper fan 130 includes a main plate 131 to which a plurality of blades 133 are coupled and a hub 131a provided at a central portion of the main plate 131 to protrude upward. The hub 131a may be coupled to the upper motor shaft 171. The plurality of blades 133 may be disposed to space apart from each other in a circumferential direction of the main plate 131.

The upper fan 130 further includes a side plate part 135 provided above the plurality of blades 133. The side plate part 135 fixes the plurality of blades 133. A lower end of each of the plurality of blades 133 may be coupled to the main plate 131, and an upper end of each of the plurality of blades 133 may be coupled to the side plate part 135.

[Housing Plate of Upper Fan Housing]

The upper fan housing 150 includes a housing plate 151 supporting a lower portion of the upper fan 130 and a hub seating part 152 which is provided at a central portion of the housing plate 151 and on which the hub 131a of the upper fan 130 is seated. The hub seating part 152 may protrude upward from the housing plate 151 to correspond to the shape of the hub 131a.

[Guide Wall]

The upper fan housing 150 further includes a guide wall 153 protruding upward from the housing plate 151 and disposed to surround at least a portion of an outer circumferential surface of the upper fan 130. The guide wall 153 may extend to be rounded from a top surface of the housing plate 151 in the circumferential direction. The guide wall 153 may extend in the circumferential direction and be gradually away from the upper fan 130.

[First Fan Passage]

A first fan passage 138a through which the air passing through the upper fan 130 flows is provided between the guide wall 153 and the outer circumferential surface of the upper fan 130. The first fan passage 138a may be understood as an air passage through which the air flows in the circumferential direction. That is, the air introduced in the axial direction of the upper fan 130 may be discharged in the radial direction of the upper fan 130 and guided by the guide wall 153 to flow while rotating in the circumferential direction along the first fan passage 138a.

The first fan passage 138a may have a cross-sectional area that gradually increases in the rotation direction of the air. That is, the first fan passage 138a may have a spiral shape. This may be called a "spiral flow". Due to this flow, the air passing through the upper fan 130 may be reduced in flow resistance, and also noise generated from the upper fan 130 may be reduced.

[First Inclined Part]

The guide wall 153 includes a first inclined part 154 extending to be inclined downward from an upper end of one side of the guide wall 153 toward the housing plate 151.

Here, one side of the guide wall 153 may be farther from the upper fan 30 than the other side disposed on an opposite side of the one side.

The downwardly inclined direction may correspond to the air flow direction in the first fan passage 138a.

An angle between the first inclined part 154 and the housing plate 151 may range from 0 degree to 60 degrees.

Due to the configuration of the first inclined part 154, it is possible to have an effect of gradually increasing in flow cross-sectional area of the air in the air flow direction.

Also, the first inclined part 154 may have a shape corresponding to an inner surface of the upper cover 120. Due to this configuration, the first inclined part 154 may extend in the circumferential direction without interfering with the upper cover 120.

[Second Fan Passage]

In the state in which the upper cover 120 is coupled to the upper fan housing 150, a second fan passage 138b disposed at a downstream side of the first fan passage 138a may be disposed between a portion of the outer circumferential surface of the upper fan 130 and an inner circumferential surface of the upper cover 120. The second fan passage 138b may extend from the first fan passage 138a in the circumferential direction in which the air flows. Thus, the air passing through the first fan passage 138a may flow to the second fan passage 138b.

The second fan passage 138b may have a flow cross-sectional greater than that of the first fan passage 138a. Thus, while the air flows from the first fan passage 138a to the second fan passage 138b, the flow cross-sectional area may increase to reduce flow resistance of the air passing through the upper fan 130 and noise generated from the upper fan 130.

[Second Inclined Part]

The guide wall 153 includes a first inclined part 156 extending to be inclined downward from an upper end of the other side of the guide wall 153 toward the housing plate 151. The downwardly inclined direction may correspond to the air flow direction in the second fan passage 138b. The second inclined part 156 may be called a cut-off.

An angle between the second inclined part 156 and the housing plate 151 may range from 0 degree to 60 degrees.

Due to the configuration of the second inclined part 154, it is possible to have an effect of gradually increasing in cross-sectional area of the air flow in the air flow direction.

Also, the second inclined part 156 may disperse an impact applied by the flow of the air rotating in the circumferential direction against the other end of the guide wall 153, and thus, the noise to be generated may be reduced. The first inclined part 154 and the second inclined part 156 define both ends of the guide wall 153. Also, the first inclined part 154 may be provided in a region between the first fan passage 138a and the second fan passage 138b, and the second inclined part 156 may be provided in a region between the second fan passage 138b and the flow guide part 160. As described above, the first and second inclined parts 154 and 156 may be provided on a boundary area, in which the air flow is changed, to improve flow performance of the air.

[Flow Guide Part]

The upper fan housing 150 further includes a flow guide part 160 guiding a flow of the air passing through the second fan passage 138b. The flow guide part 160 protrudes upward from a top surface of the housing plate 151.

Also, the flow guide part 160 may be disposed on an outer surface of the guide wall 153. Due to the arrangement of the flow guide part 160, the air flowing in the circumferential direction via the first and second fan passages 138a and 138b may be easily introduced into the flow guide part 160. The flow guide part 160 includes a guide body 161 extending to be inclined downward in the flow direction of the air, i.e., the circumferential direction. That is, the guide body 161 includes a rounded surface or an inclined surface.

An air passage is provided in the flow guide part 160. In detail, an inflow part 165 into which the air passing through the second fan passage 138b is introduced is provided in a front end of the flow guide part 160 with respect to the flow direction of the air. The inflow part 165 may be understood as an opened space part. The guide body 161 may extend to be inclined downward from the inflow part 165 toward the top surface of the housing plate 151.

[Cutoff Part]

A cutoff part 151a is provided on the housing plate 151. The cutoff part 151a is understood as a portion in which at least a portion of the housing plate 151 passes in the vertical direction. The inflow part 165 may be disposed above the cutoff part 151a.

The inflow part 165 may be defined as the first discharge part 25 together with the cutoff part 151a. The first discharge part 25 may be understood as a discharge hole for discharging the air flow existing above the housing plate 151, i.e., the air flowing through the first and second fan passages 138a and 138b to a lower side of the housing plate 151. Thus, the air flowing through the second fan passage 138b may flow to the lower side of the housing plate 151 through the first discharge part 25.

[First Discharge Guide Part]

A first discharge guide part 158 for guiding the air flow discharged through the first discharge part 25 in the radial direction is provided on a bottom surface of the housing plate 151. The first discharge guide part 158 may protrude downward from the bottom surface of the housing plate 151 to extend from the central portion of the housing plate 151 in the outer radical direction. Also, the first discharge guide part 158 may be disposed at an outlet-side of the first discharge part 25.

A plate recess part 158a recessed downward is provided on the housing plate 151. The protruding shape of the first discharge guide part 158 may be realized by the plate recess part 158a. For example, the first discharge guide part 158 may be formed in a manner in which a portion of the housing plate 151 is recessed downward to form the plate recess part 158a.

The first discharge guide part 158 may have an outer circumferential surface that is curved in both directions to convert a flow path while minimizing a flow loss of the air discharged through the first discharge part 25.

The air flow discharged through the first discharge part 25 may have a rotating property. Thus, when the air contacts the first discharge guide part 158, the air flow direction may be changed into the radial direction by the first discharge guide part 158 and then be discharged. Alternatively, the upper air guide 180 together with the first discharge guide part 158 may guide the air flow in the radial direction.

Due to this configuration, the air suctioned downward to the upper fan 130 through the first suction part 21 is guided in the circumferential direction and thus has rotation force and is discharged through the first discharge part 25. Also, the discharged air may be guided by the first discharge guide part 158 and the upper air guide 180 and thus be easily discharged through the first discharge passage 26 in the radial direction.

<Configuration of Lower Module>

Figure 8:
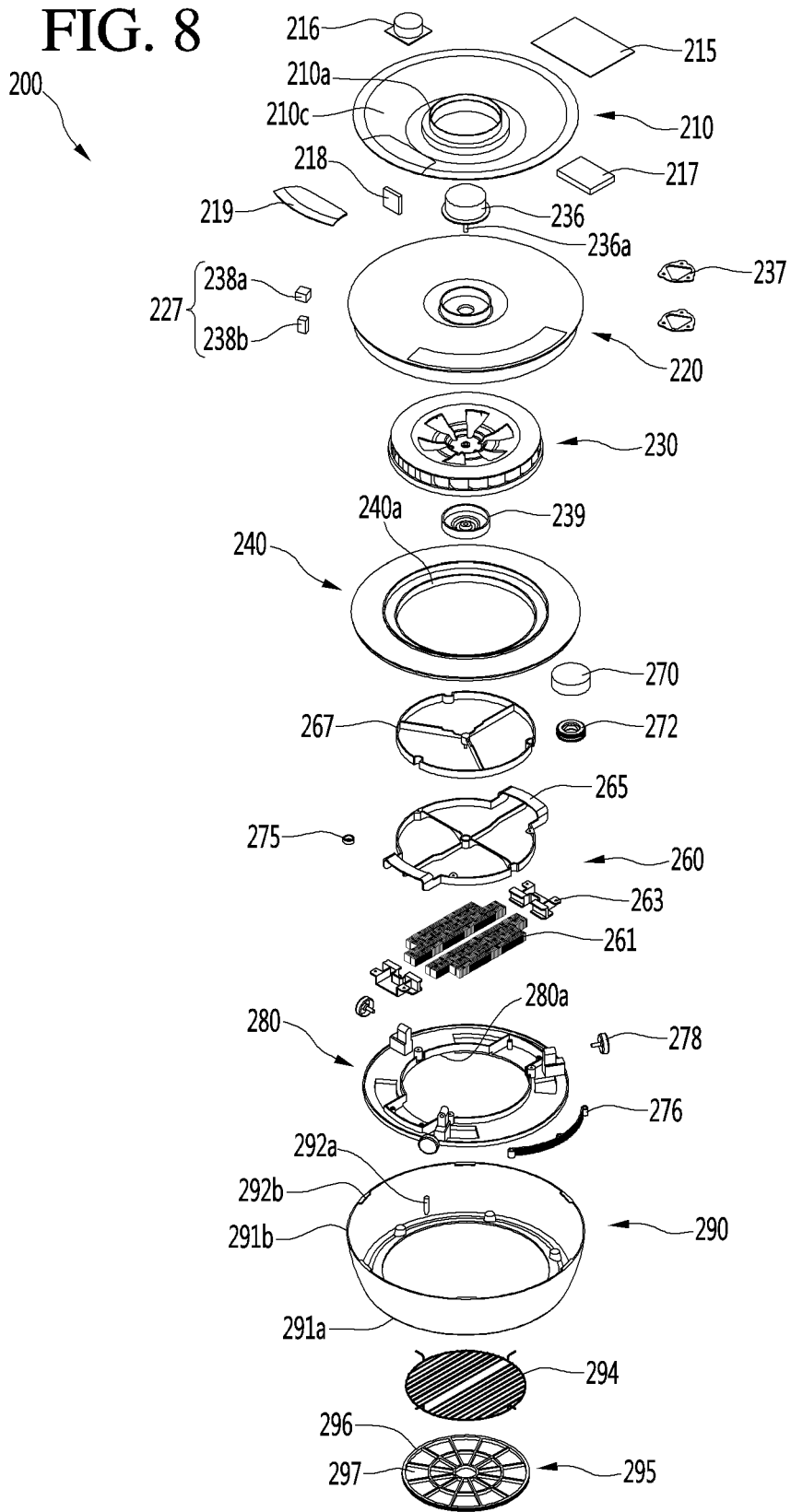
FIG. 8 is an exploded perspective view illustrating a configuration of the lower module according to the first embodiment of the present invention.

FIG. 8 is an exploded perspective view illustrating a configuration of the lower module according to the first embodiment of the present invention.

[Lower Fan and Low Fan Housing]

Referring to FIGS. 3 and 8, the lower module 200 according to an embodiment of the present invention includes a lower fan 130 generating an air flow and a lower fan housing 220 in which the lower fan 230 is installed. The lower fan 230 may include a centrifugal fan that suctions the air in the axial direction and discharges the suctioned air in the radial direction. For example, the lower fan 230 may include a sirocco fan.

The lower fan housing 220 may have a guide structure that is coupled to an upper portion of the lower fan 230 and guides the air flow generated by rotation of the lower fan 230 to the second discharge part 27.

[Lower Motor]

Figure 13:
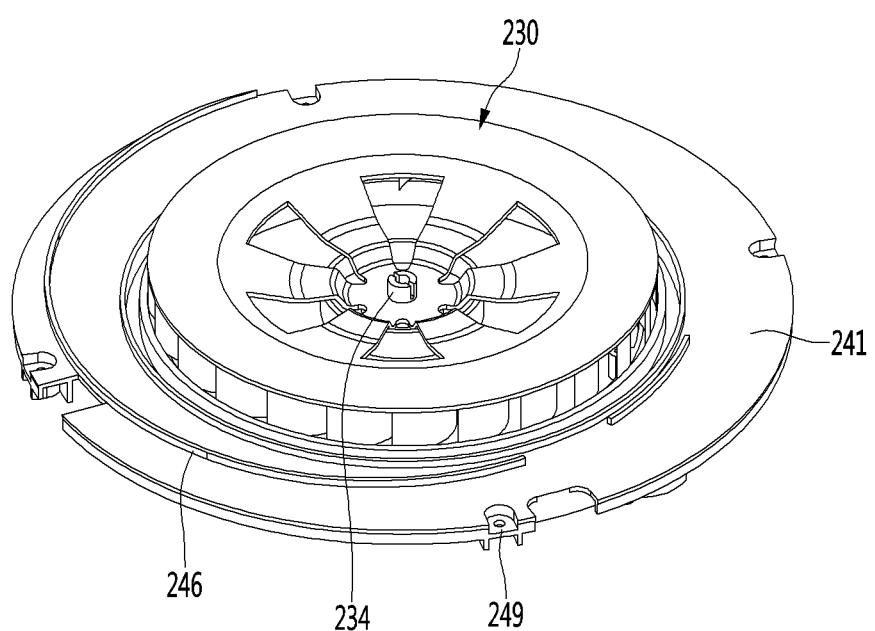
FIG. 13 is a bottom perspective view illustrating a configuration of an upper orifice and the lower fan according to the first embodiment of the present invention.
Figure 14:
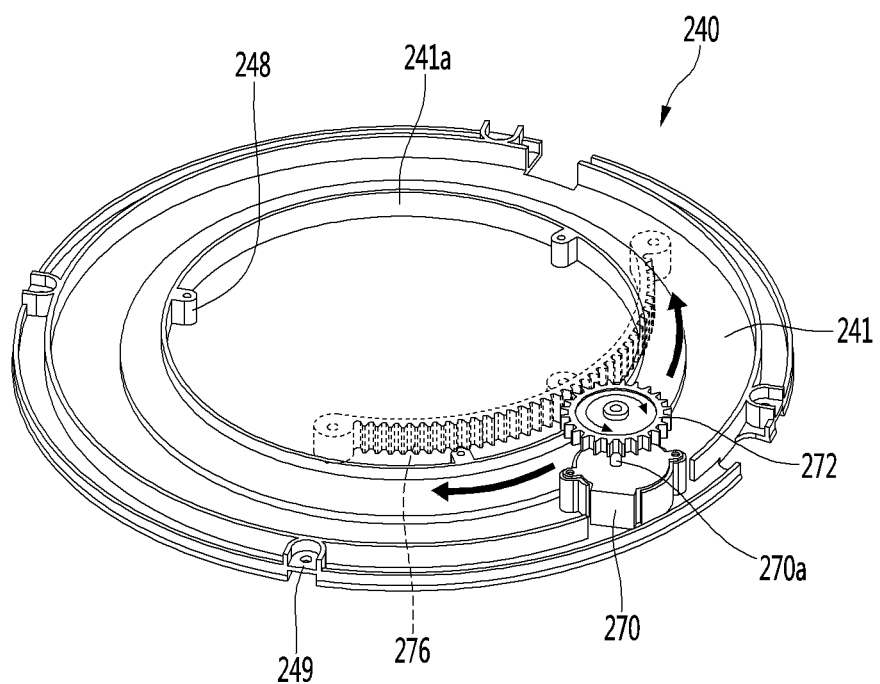
FIG. 14 is a perspective view illustrating a state in which a rotary motor is installed on the upper orifice according to the first embodiment of the present invention.

The lower module 200 further includes a lower motor 236 connected to the lower fan 230 to provide driving force. A lower motor shaft 236a is provided below the lower motor 236. The lower motor shaft 236a may extend downward from the lower motor 236. Also, the lower motor 236 may be disposed above the lower fan housing 220, and the lower motor shaft 236a may be disposed to pass through the lower fan housing 220 and the lower fan 230. Also, a shaft coupling part (see reference numeral 234 of FIG. 13) to which the lower motor shaft 236a is coupled is provided on the lower fan 230.

[Locking Part]

The lower module 200 further includes a lower locking part 239 coupled to the lower motor shaft 236a. The lower locking part 239 is disposed on a hub 231a of the lower fan 230 to fix the lower motor 236 to the lower fan 230.

[Lower Cover]

The lower module 200 further includes a lower cover 290 disposed to surround the lower fan 230 and the lower fan housing 220. In detail, the lower cover 290 includes a cover inflow part 291a which has an opened lower end and through which the air suctioned through the second suction part 23 is introduced. Also, the lower cover 290 further includes a cover discharge part 291b having an opened upper end. The air passing through the lower fan 230 may flow to the second discharge passage 28 through the cover discharge part 291b.

The cover discharge part 291b may have a size greater than that of the cover inflow part 291a. Thus, the lower cover 290 may have a truncated conical shape with opened upper and lower ends. Due to this configuration, the air passing through the lower fan 290 may flow to be gradually spread in a circumferential direction and then easily discharged through the first discharge part 27.

[Protection Member]

The lower module 200 further includes a protection member 294 provided below the lower cover 29p to block heat generated from a heater assembly 260. The protection member 294 may have an approximately circular plate shape. The protection member 294 may be made of a steel material that is not burned by heat. Due to the protection member 294, the heat may not be transferred to a second pre-filter 295 to prevent the second pre-filter 295 from being damaged.

[Second Pre-Filter]

The lower module 200 further includes the second pre-filter 295 provided below the protection member 294. The second pre-filter 295 may include a filter frame 296 and a filter member 297 coupled to the filter frame 296. Foreign substances contained in the air suctioned through the second suction part 23 may be filtered by the second pre-filter 295. It is understood that a lower space part of the second pre-filter 295 provides the second suction part 23.

[Lower Air Guide]

The lower module 200 further includes a lower air guide 210 provided above the lower fan housing 220 to guide the air passing through the lower fan housing 220. The lower air guide 210 has a hollow plate shape. In detail, the lower air guide 210 includes a central portion 210a into which the lower motor 236 is inserted, an edge portion 210b defining an outer circumferential surface of the lower air guide 210, and a guide extension part 210c extending from the central portion 210a toward the edge portion 210b in an outer radial direction.

The guide extension part 210c may extend to be inclined upward or rounded upward from the central portion 210a toward the edge portion 210b. Due to this configuration, the air discharged upward from the lower fan housing 220 through the second discharge part 27 may be guided to the outside of the main body 20 to flow to the second discharge passage 28.

[PCB Device]

A plurality of components may be installed on a top surface of the guide extension part 210c. The plurality of components include a PCB device provided with a main PCB 215 for controlling the flow generator 10. Also, the PCB device further includes a regulator 216 stably supplying power to be supplied to the flow generator 10. Power having a constant voltage may be supplied to the flow generator 10 by the regulator 216 even though a voltage or frequency of input power varies.

[Communication Module]

The plurality of components further include a communication module. The flow generator 10 may communicate with an external server through the communication module. For example, the communication module may include a Wi-Fi module.

[LED Device]

The plurality of components further include an LED device. The LED device may constitute a display part of the flow generator 10.

The LED device includes an LED PCB 218 on which an LED is installed and an LED cover 219 provided outside the LED PCB 218 in the radial direction to diffuse the light emitted from the LED. The LED cover 219 may be called a "diffusion plate".

The LED cover 219 may be disposed to be integrally coupled to outer circumferential surfaces of the upper air guide 180 and the lower air guide 220 along outer circumferences of the upper air guide 180 and the lower air guide 220.

[Coupling Structure of Upper Air Guide and Lower Air Guide]

The upper air guide 180 and the lower air guide 210 may be coupled to each other. The upper air guide 180 and the lower air guide 210 may be collectively called an "air guide device". The air guide device partitions the upper module 100 from the lower module 200. In other words, the air guide device may space the upper module 100 and the lower module 200 apart from each other. Also, the air guide device may support the upper module 100 and the lower module 200.

In detail, the lower air guide 210 may be coupled to a lower portion of the upper air guide 180. Due to the coupling between the upper air guide 180 and the lower air guide 210, a motor installation space is defined in each of the air guide devices 10 and 210. Also, the upper motor 170 and the lower motor 236 may be accommodated in the motor installation space. Due to this configuration, space utilization of the device may be improved.

[Upper Orifice]

The lower module 200 further includes an upper orifice 240 which is provided below the lower fan housing 220 and in which a driving device for rotation of portions of the upper module 100 and the lower module 200 is installed. The upper orifice 240 have an opened central portion 240a and an annular shape. The central portion 240a may provide a passage for the air suctioned through the second suction part 23.

[Driving Device]

The driving device include a rotary motor 270 generating driving force. For example, rotary motor 270 may include a step motor that is easy to adjust a rotation angle.

The driving device further includes a power transmission device connected to the rotary motor 270. The power transmission device may include a pinion gear 272 coupled to the rotary motor 270 and a rack gear 276 interlocked with the pinion gear 272. The rack gear 276 may have a shape that is rounded to correspond to a rotational curvature of each of the upper module 100 and the lower module 200.

[Lower Orifice]

The lower module 200 further includes a lower orifice 280 provided below the upper orifice 240. The lower orifice 280 is coupled to the leg 30. In detail, both sides of the lower orifice 280 may be coupled to the first leg extension part 33 and the second leg extension part 35. Thus, the lower orifice 280 may be understood as a fixed component of the lower module 200.

[Rack Gear]

The rack gear 276 may be coupled to the lower orifice 280. The lower orifice 280 have an opened central portion 280a and an annular shape. The central portion 280a may provide a passage for the air suctioned through the second suction part 23. Air passing through a central portion 280a of the lower orifice 280 may pass through a central portion 240a of the upper orifice 240.

[Second Air Treating Device]

The lower module 200 further includes a second air treating device that operates to air-condition or purify air flowing the lower module 200. The second air treating device may perform a function different from that of the first air treating device. For example, the second air treating device includes a heater assembly 260 supported by the lower orifice 280 and generating predetermined heat.

In detailed, the heater assembly 260 includes a heater 261. The heater 261 may be disposed at an opened central portion 280a of the lower orifice 240 to heat the air suctioned through the second suction part 23. For example, the heater 261 may include a PTC heater.

The heater assembly 260 further includes a heater bracket 263 supporting both sides of the heater 261. The heater bracket 263 may be coupled to the lower orifice 280.

[Roller]

The lower orifice 280 includes a roller guiding rotation of the upper module 100 and the lower module 200. The roller 278 may be coupled to an edge portion of the lower orifice 280 and provided in plurality in the circumferential direction. The roller 278 may contact a bottom surface of the upper orifice 240 to guide rotation, i.e., revolution of the upper orifice 240.

[Support]

The lower module 200 further includes supports 265 and 267 disposed above the heater assembly 260. The supporters 265 and 267 include a first supporter 265 coupled to an upper portion of the heater 261 and a second supporter 267 coupled to an upper portion of the first supporter 265.

The first supporter 265 may space the heater assembly 260 and the lower fan 230 apart from each other to prevent heat generated from the heater assembly 260 from adversely affecting other components. Also, the second supporter 267 provides a rotation center of each of the rotating upper module 100 and the rotating lower module 200. Also, a bearing 275 is provided on the second supporter 267 to guide movement of the rotating component.

[Lower Fan and Low Fan Housing]

Figure 9:
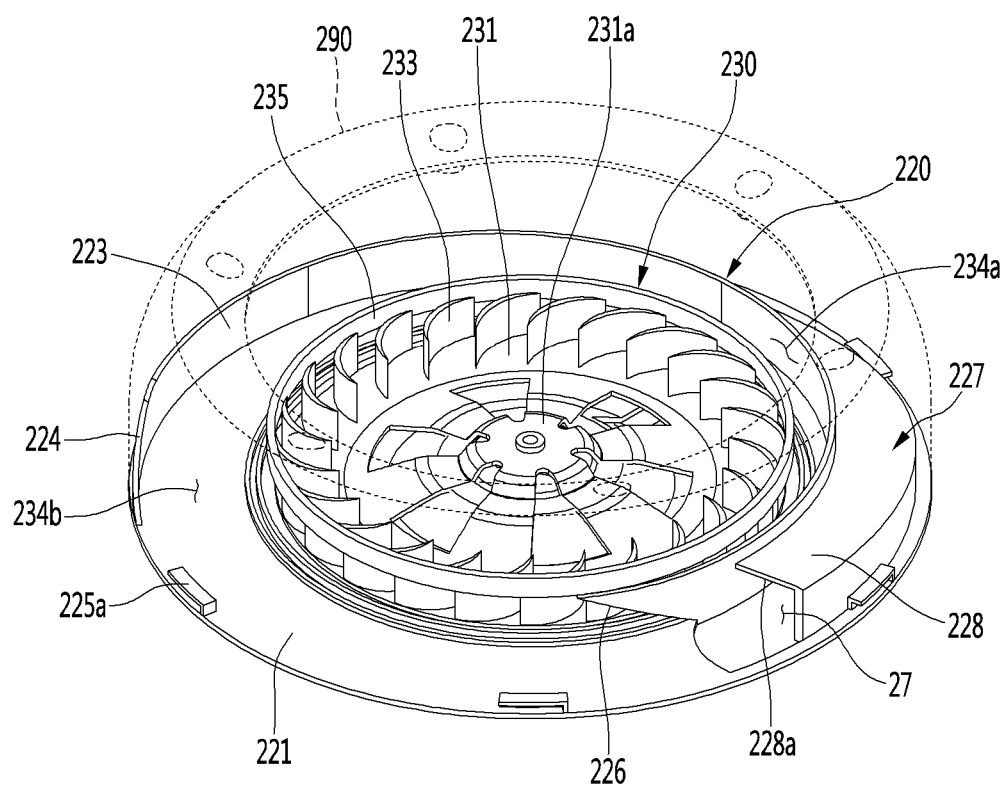
FIG. 9 is a view illustrating a configuration of a lower fan housing and a lower fan according to the first embodiment of the present invention.
Figure 10:
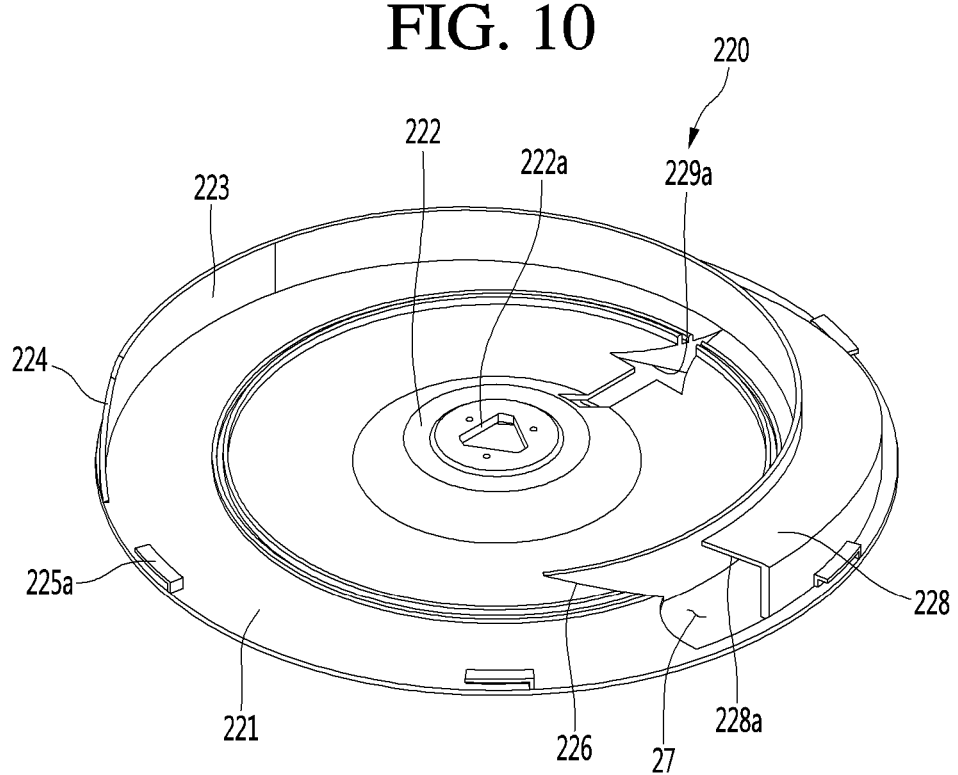
FIG. 10 is a perspective view of a configuration of the lower fan housing according to the first embodiment of the present invention.
Figure 11:
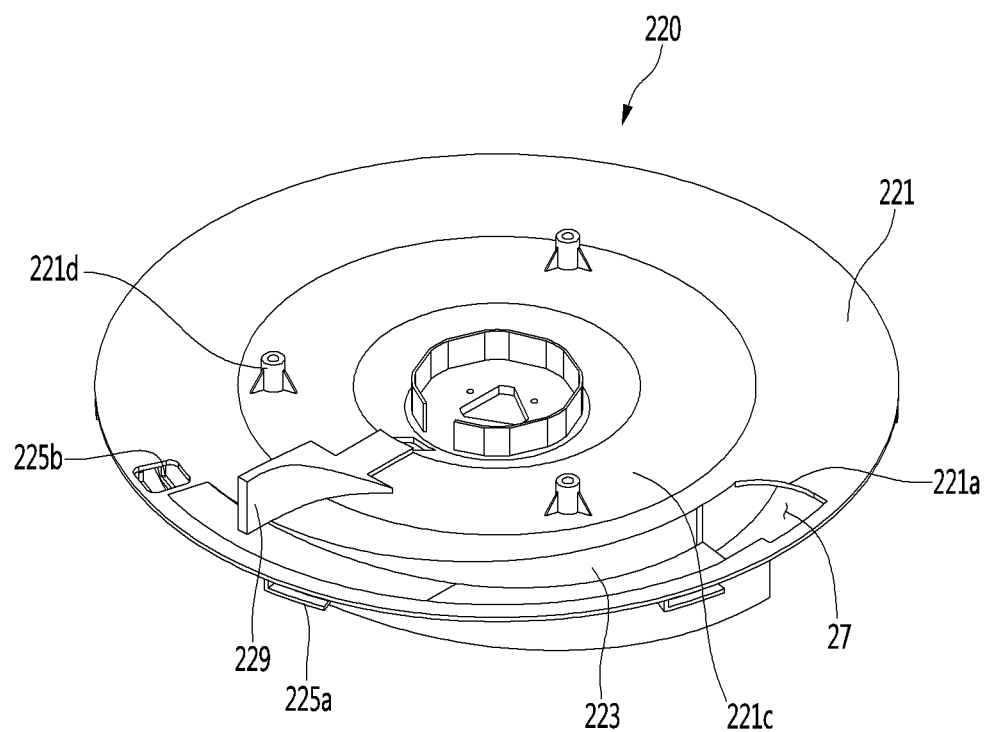
FIG. 11 is a bottom perspective view illustrating the configuration of the lower fan housing according to the first embodiment of the present invention.
Figure 12:
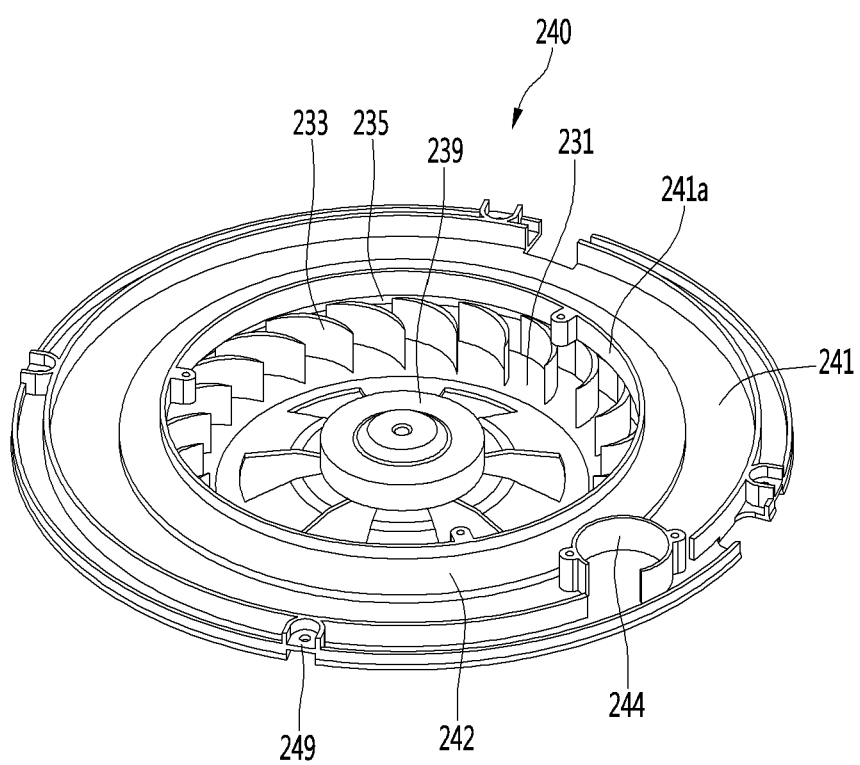
FIG. 12 is a perspective view illustrating a configuration of an upper orifice and the lower fan according to the first embodiment of the present invention.

FIG. 9 is a view illustrating a configuration of the lower fan housing and the lower fan according to the first embodiment of the present invention, FIG. 10 is a perspective view of a configuration of the lower fan housing according to the first embodiment of the present invention, and FIG. 11 is a bottom perspective view illustrating the configuration of the lower fan housing according to the first embodiment of the present invention.

Referring to FIGS. 3 and 9 to 11, the lower module 200 according to an embodiment of the present invention includes the lower fan 230 generating an air flow and the lower fan housing 220 coupled to an upper portion of the lower fan 230 and surrounding at least a portion of the outer circumferential surface of the lower fan 230.

[Detailed Configuration of Lower Fan]

The lower fan 230 may have a cylindrical shape as a whole. In detail, the lower fan 230 includes a main plate 231 to which a plurality of blades 233 are coupled and a hub 231a provided at a central portion of the main plate 231 to protrude upward. The hub 231a may be coupled to the lower motor shaft 236a. The plurality of blades 233 may be disposed to space apart from each other in a circumferential direction of the main plate 231.

The lower fan 230 further includes a side plate part 235 provided below the plurality of blades 233. The side plate part 235 fixes the plurality of blades 233. A lower end of each of the plurality of blades 233 may be coupled to the main plate 231, and a lower end of each of the plurality of blades 233 may be coupled to the side plate part 235.

[Difference in Size of Upper Fan and Lower Fan]

A vertical height Ho of the upper cover 120 and a vertical height Ho' of the lower cover 290 may be substantially the same. Due to this configuration, the flow generator 10 may have a compact outer appearance and an elegant design.

On the other hand, a vertical height H2 of the lower fan 230 may be less than a vertical height H1 of the upper fan 130. This is done for compensating a height of the heater assembly 260 provided in only in the lower module 200. Here, the lower fan 230 may have a relatively low height. Thus, maximum performance of the upper fan 130 may be greater than that of the lower fan 230.

For example, when the upper fan 130 and the lower fan 230 rotate at the same number of revolution, an amount of air discharged from the upper module 100 may be greater than that of air discharged from the lower module 200. Thus, in order to control an amount of air discharged from the upper module 100 and an amount of air discharged from the lower module 200 to be the same, the number of revolution of the lower fan 230 may be adjusted to be greater than that of the upper fan 130. As a result, the mixed air flow discharged from the upper module 100 and the lower module 200 may be easily discharged in the radial direction without being biased upward and downward.

[Detailed Structure of Lower Fan Housing]

The lower fan housing 220 includes a housing plate 221 supporting an upper portion of the lower fan 230 and a hub seating part 222 which is provided at a central portion of the housing plate 221 and on which the hub 231a of the lower fan 230 is seated. The hub seating part 222 may protrude downward from the housing plate 221 to correspond to the shape of the hub 231a. Also, a shaft through-hole 222a through which the lower motor shaft 236a passes may be defined in the hub seating part 222.

The lower fan housing 220 further includes a guide wall 223 protruding downward from the housing plate 221 and disposed to surround at least a portion of an outer circumferential surface of the lower fan 230. The guide wall 223 may extend to be rounded from a top surface of the housing plate 151 in the circumferential direction. Since the lower fan 230 has a height H2 less than that H1 of the upper fan 130, a guide wall 223 of the lower fan housing 220 has a height less than that of a guide wall 153 of the lower fan housing 150.

[First Fan Passage]

A first fan passage 234a through which the air passing through the lower fan 230 flows is provided between the guide wall 223 and the outer circumferential surface of the lower fan 230. The first fan passage 234a may be understood as an air passage through which the air flows in the circumferential direction. That is, the air introduced in the axial direction of the lower fan 230 may be discharged in the radial direction of the lower fan 230 and guided by the guide wall 223 to flow while rotating in the circumferential direction along the first fan passage 234a.

The first fan passage 234a may have a cross-sectional area that gradually increases in the rotation direction of the air. That is, the first fan passage 234a may have a spiral shape. This may be called a "spiral flow". Due to this flow, the air passing through the lower fan 230 may be reduced in flow resistance, and also noise generated from the upper fan 230 may be reduced.

[First Inclined Part]

The guide wall 223 includes a first inclined part 224 extending to be inclined upward from a lower end of one side of the guide wall 223 toward the housing plate 221. The upwardly inclined direction may correspond to the air flow direction in the first fan passage 234a. Due to the configuration of the first inclined part 224, it is possible to have an effect of gradually increasing in flow cross-sectional area of the air in the air flow direction.

[Effect of Hook and Hook Coupling Part]

The housing plate 221 includes a hook 225a hooked with the lower cover 290. The hook 225a may have a shape that protrudes from the top surface of the housing plate 151 and then is bent in one direction, e.g., a "⌐" shape. The hook coupling part 292b having a shape corresponding to the hook 225a is disposed on the lower cover 290.

[Second Fan Passage]

In the state in which the lower cover 290 is coupled to the lower fan housing 220, a second fan passage 234b disposed at a downstream side of the first fan passage 234a may be disposed between a portion of the outer circumferential surface of the lower fan 230 and an inner circumferential surface of the lower cover 290. The second fan passage 234b may extend from the first fan passage 234a in the circumferential direction in which the air flows. Thus, the air passing through the first fan passage 234a may flow to the second fan passage 234b.

The second fan passage 234b may have a flow cross-sectional greater than that of the first fan passage 234a. Thus, while the air flows from the first fan passage 234a to the second fan passage 234b, the flow cross-sectional area may increase to reduce flow resistance of the air passing through the upper fan 230 and noise generated from the lower fan 230.

[Second Inclined Part]

The guide wall 223 includes a second inclined part 226 that extends to be inclined upward from a lower end of the other side of the guide wall 223 toward the housing plate 221. The upwardly inclined direction may correspond to the air flow direction in the second fan passage 234b. The second inclined part 226 may be called a cut-off. Due to the configuration of the second inclined part 226, it is possible to have an effect of gradually increasing in cross-sectional area of the air flow in the air flow direction.

The first inclined part 224 and the second inclined part 226 define both ends of the guide wall 223. Also, the first inclined part 224 may be provided in a region between the first fan passage 234a and the second fan passage 234b, and the second inclined part 226 may be provided in a region between the second fan passage 234b and the flow guide part 227. As described above, the first and second inclined parts 224 and 226 may be provided on a boundary area, in which the air flow is changed, to improve flow performance of the air.

[Flow Guide Part]

The lower fan housing 220 further includes a flow guide part 227 guiding the air passing through the second fan passage 234b. The flow guide part 227 protrudes upward from a bottom surface of the housing plate 221. For convenience of description, the flow guide part 160 provided in the upper module 100 is called a "first flow guide part", and the flow guide part 227 provided in the lower module 200 is called a "second flow guide part".

Also, the flow guide part 227 may be disposed on an outer surface of the guide wall 223. Due to the arrangement of the flow guide part 227, the air flowing in the circumferential direction via the first and second fan passages 234a and 234b may be easily introduced into the flow guide part 227. The flow guide part 227 includes a guide body 228 extending to be inclined downward in the flow direction of the air, i.e., the circumferential direction. That is, the guide body 228 includes a rounded surface or an inclined surface.

An air passage is provided in the flow guide part 227. In detail, an inflow part 228a into which the air passing through the second fan passage 234b is introduced is provided in a front end of the flow guide part 227 with respect to the flow direction of the air. The inflow part 228a may be understood as an opened space part. The guide body 228 may extend to be inclined upward from the inflow part 228a toward the top surface of the housing plate 221.

[Cutoff Part]

A cutoff part 221a is provided on the housing plate 221. The cutoff part 221a is understood as a portion in which at least a portion of the housing plate 221 passes in the vertical direction. The inflow part 228a may be disposed below the cutoff part 221a.

The inflow part 228a may define a second discharge part 27 together with the cutoff part 221a. The second discharge part 27 may be understood as a discharge hole for discharging the air flow existing below the housing plate 221, i.e., the air flowing through the first and second fan passages 234a and 234b to an upper side of the housing plate 221. Thus, the air flowing through the second fan passage 234b may flow to the upper side of the housing plate 221 through the first discharge part 27.

[Second Discharge Guide Part]

A first discharge guide part 229 for guiding the air flow discharged through the first discharge part 27 in the radial direction is provided on a top surface of the housing plate 221. The first discharge guide part 229 may protrude upward from the top surface of the housing plate 221 to extend from the central portion of the housing plate 221 in the outer radical direction. The second discharge guide part 229 may be disposed at an outlet-side of the second discharge part 27 and be disposed below the first discharge guide part 158.

A plate recess part 229a recessed upward is provided on the housing plate 221. The protruding shape of the second discharge guide part 229 may be realized by the plate recess part 229a. For example, the second discharge guide part 229 may be formed in a manner in which a portion of the housing plate 221 is recessed upward to form the plate recess part 229a.

Also, the second discharge guide part 229 may have an outer circumferential surface that is curved in both directions to convert a flow path while minimizing a flow loss of the air discharged through the second discharge part 27.

[Operation of Second Discharge Guide Part]

The air flow discharged through the second discharge part 27 may have a rotating property. Thus, when the air contacts the second discharge guide part 229, the air flow direction may be changed into the radial direction by the second discharge guide part 229 and then be discharged. Alternatively, the lower air guide 210 together with the second discharge guide part 229 may guide the air flow in the radial direction.

Due to this configuration, the air suctioned upward toward the lower fan 230 through the second suction part 23 may be guided in the circumferential direction and thus have rotation force. Then, the air may be discharged through the second discharge part 27 and be guided by the second discharge guide part 229 and the lower air guide 210 so that the air is easily discharged through the second discharge passage 28 in the radial direction.

[Guide Seating Part]

A guide seating part 221c on which the lower air guide 210 is seated is provided on the top surface of the housing plate 221. The lower air guide 210 may be stably supported by the guide seating part 221c. Also, a second guide coupling part 221d to which the lower air guide 210 is coupled is provided on the guide seating part 221c. A predetermined coupling member may be coupled to the lower air guide 210 through the second guide coupling part 221d.

[Upper Orifice Body]

Referring to FIGS. 3 and 12 to 14, the upper orifice 240 according to an embodiment is coupled to a lower portion of the lower fan housing 220. In detail, the upper orifice 240 includes an upper orifice body 241 having an opened central portion 241a. The opened central portion 241a may provide an air passage through which air is transferred to the lower fan 230. The upper orifice body 241 may have an approximately annular shape by the opened central portion 241a.

[Fan Guide]

The upper orifice 240 includes a fan guide 242 into which the side plate part 235 of the lower fan 230 is inserted. The fan guide 244 may protrude downward from a bottom surface of the upper orifice body 241. The fan guide 244 may be disposed to surround the opened central portion 241a.

[Motor Support]

The upper orifice 240 further includes a motor support 244 supporting the rotary motor 270. The motor support 244 may protrude downward from the upper orifice body 241 and be disposed to surround an outer circumferential surface of the rotary motor 270. The rotary motor 270 may support the bottom surface of the upper orifice body 241 and be inserted into the motor support 244.

[Driving Device]

The lower module 200 includes a driving device generating driving force to guide the rotation of the upper module 100 and the lower module 200. The upper module 100 and the lower module 200 may integrally rotate by the driving device.

The driving device includes the rotary motor 270 and gears 272 and 276. The gears 272 and 276 may include a pinion gear 272 and a rack gear 276.

The rotary motor 270 may be coupled to the pinion gear 272. The pinion gear 272 may be disposed below the rotary motor 270 and coupled to a motor shaft 270a of the rotary motor 270. When the rotary motor 270 is driven, the pinion gear 272 may also rotate.

The pinion gear 272 may be interlocked with the rack gear 276. The rack gear 276 may be disposed inside the flow generator 10 more than the pinion gear 272. Also, the rack gear 276 may be fixed to the lower orifice 280.

Since the rack gear 276 is a fixed component, when the pinion gear 272 rotates, the rotary motor 270 and the pinion gear 272 may rotate, i.e., revolve around a center of the opened central portion 241a of the upper orifice 240. Also, the upper orifice 240 supporting the rotary motor 270 rotates.

[Second Supporter Coupling Part]

The upper orifice 240 further includes a second supporter coupling part 248 coupled to the second supporter 267. The second supporter coupling part 248 may be provided on an inner circumferential surface of the central portion 241a of the upper orifice 240. The second supporter 267 includes a second coupling part 267d coupled to the second supporter coupling part 248. A predetermined coupling member may be coupled to the second coupling part 267d through the second supporter coupling part 248.

[Cover Coupling Part]

The upper orifice 240 further includes a cover coupling part 249 coupled to the lower cover 290. The cover coupling part 249 may be provided in plurality along an edge portion of the upper orifice body 241. The plurality of cover coupling parts 249 may be disposed to space apart from each other in the circumferential direction.

[Orifice Coupling Part]

The lower cover 290 includes an orifice coupling part 292a coupled to the cover coupling part 249. The orifice coupling part 292a is disposed on an inner circumferential surface of the lower cover 290 and provided in plurality to correspond to the cover coupling part 249. A predetermined coupling member may be coupled to the cover coupling part 249 through the orifice coupling part 292a.

[Wall Support]

The upper orifice 240 further includes a wall support supporting the guide wall 223 of the lower fan housing 220. The wall support 246 may protrude upward from the top surface of the upper orifice body 241. Also, the wall support 246 may support an outer circumferential surface of the guide wall 223.

[Lower Orifice Body]

Figure 15:
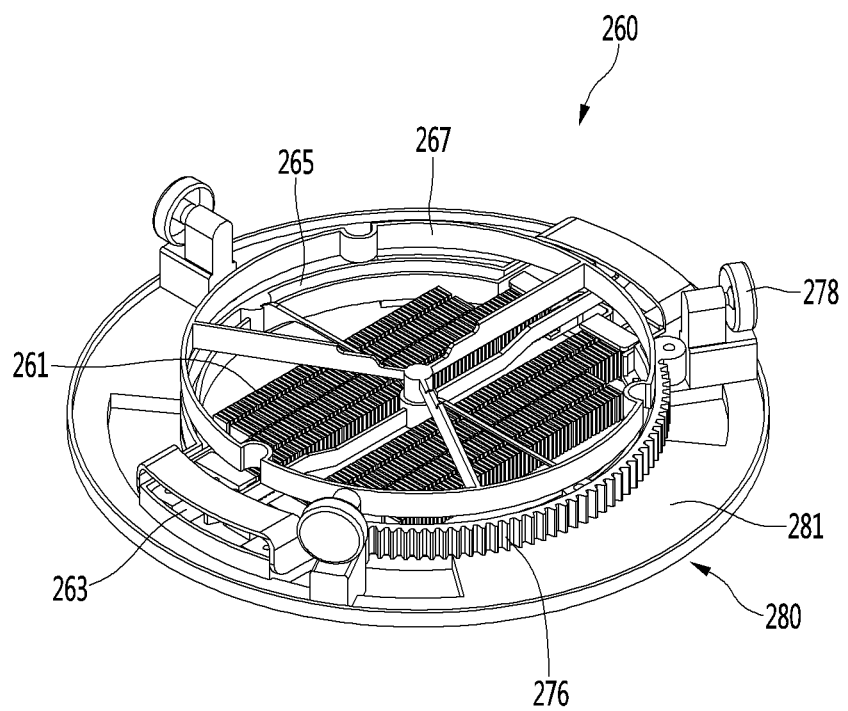
FIG. 15 is a perspective view of a configuration of a heater assembly according to the first embodiment of the present invention.
Figure 16:
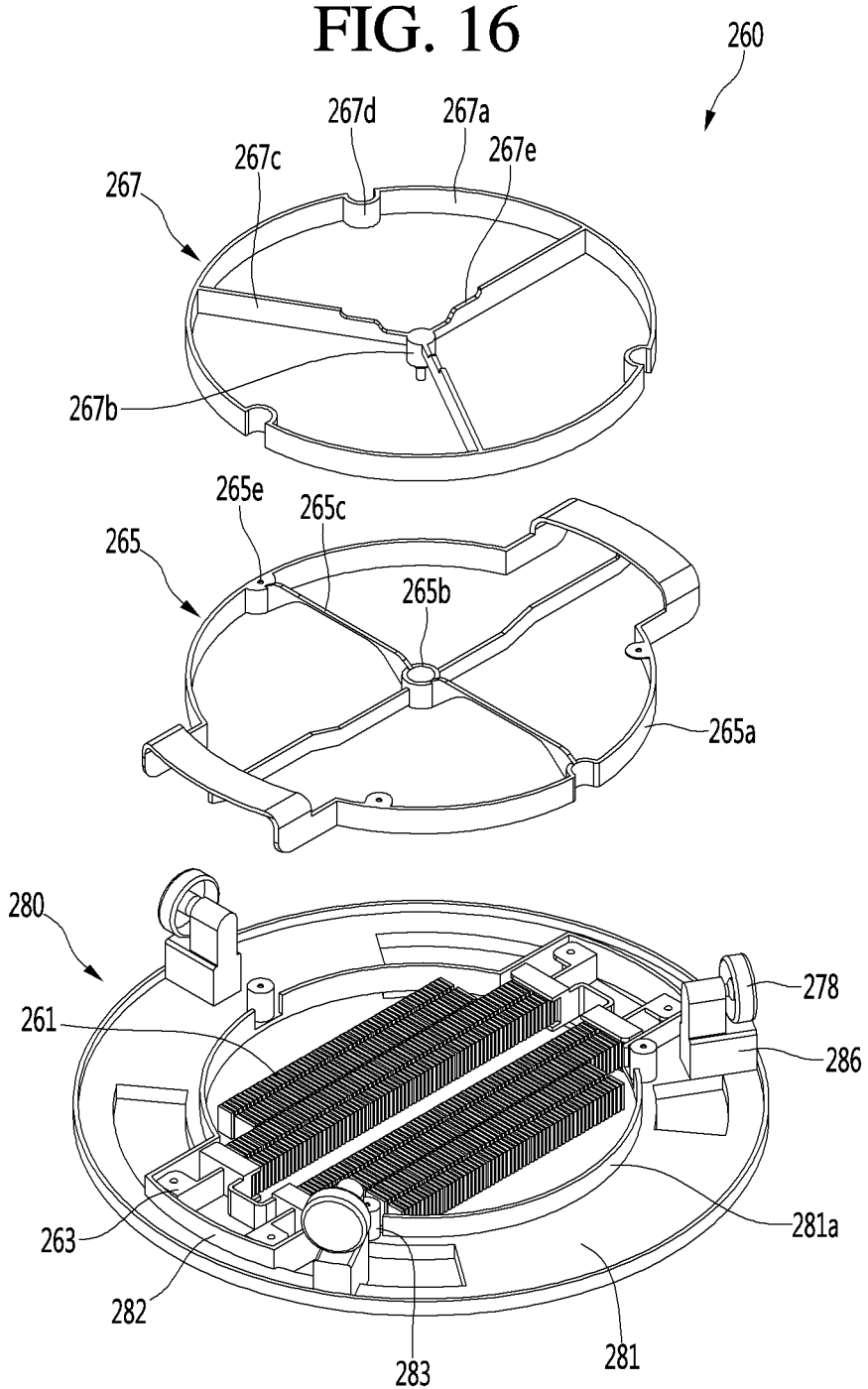
FIG. 16 is an exploded perspective view illustrating a configuration of the heater assembly according to the first embodiment of the present invention.
Figure 17:
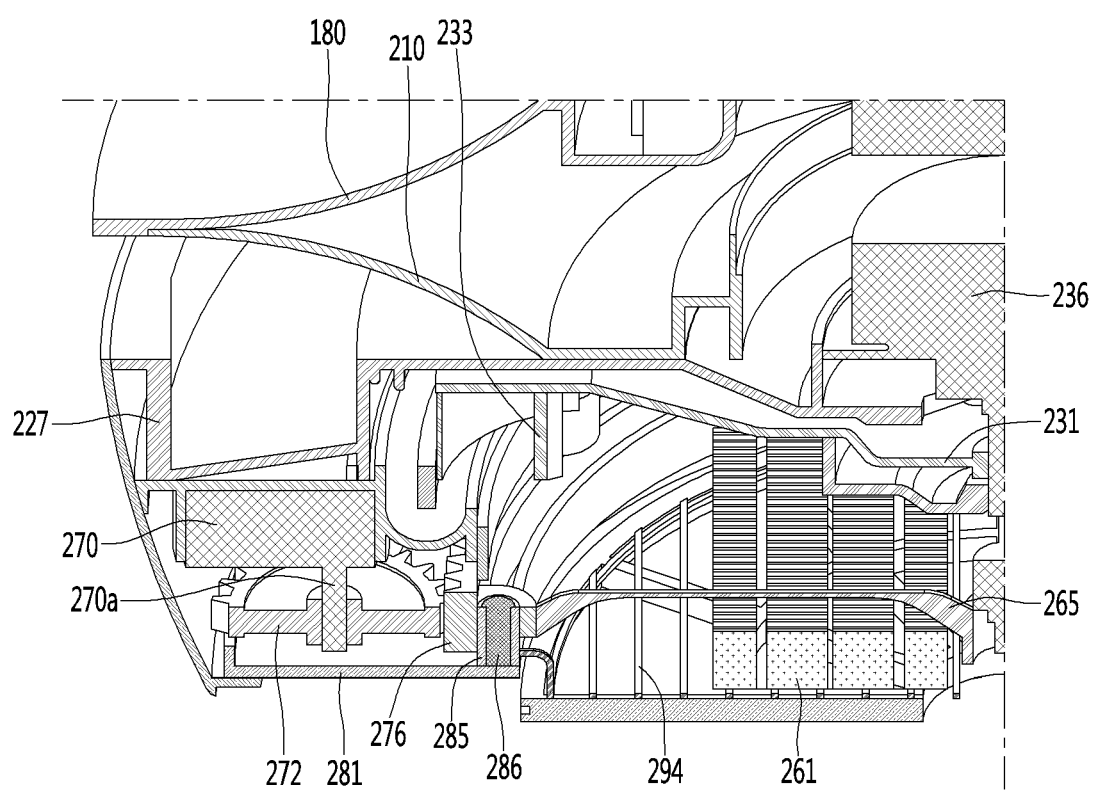
FIG. 17 is a cross-sectional view illustrating a configuration of the rotary motor and a power transmission device according to the first embodiment of the present invention.

Referring to FIGS. 15 to 17, the heater assembly 260 according to an embodiment of the present invention may be mounted on the lower orifice 280. The lower orifice 280 includes a lower orifice body 281 having an opened central portion 281a. The opened central portion 281a may provide an air passage through which the air suctioned through the second section part 23 is transferred to the opened central portion 241a of the upper orifice 240. The lower orifice body 281 may have an approximately annular shape by the opened central portion 281a.

[Rack Coupling Part]

The lower orifice 280 further includes a rack coupling part 285 coupled to the rack gear 276. The rack coupling part 285 may protrude upward from a top surface of the lower orifice body 281 and have an insertion groove into which a rack coupling member 286 is inserted. The rack coupling member 286 may pass through the rack gear 276 and be coupled to the rack coupling part 285.

[Bracket Support]

The heater assembly 260 include a heater 261 and a heater bracket 263 supporting both sides of the heater 261. The heater 261 may be inserted into the opened central portion 281a.

The lower orifice body 281 further includes a bracket support 282 on which the heater bracket 263 is mounted. The bracket support 282 may be provided on each of both sides of the lower orifice body 281. The heater bracket 263 may be coupled to the bracket support 282 by a predetermined coupling member.

[Roller Support]

A roller support 286 supporting the roller 278 is provided on the lower orifice body 281. While the upper orifice 240 rotates, the roller 278 may contact the upper orifice 240 to perform a rolling operation.

[First Supporter Coupling Part]

The lower orifice body 281 includes a second supporter coupling part 283 coupled to the second supporter 265. The first supporter coupling part 283 may be provided on an edge-side of the central portion 241a. The first supporter 265 includes a first coupling part 265e coupled to the first supporter coupling part 283. A predetermined coupling member may be coupled to the first coupling part 265e through the first supporter coupling part 283.

[First Supporter]

The first supporter 265 is disposed above the lower orifice 280. Also, the first supporter 265 may be placed on the heater assembly 260. The first supporter 265 may be made of a metal material, for example, an aluminum material.

The first supporter 265 supports a rotating component of the lower module 200. Also, the first supporter 265 together with the second supporter 267 may protect the components disposed on the lower module 200 so that the components do not directly contact the heater assembly 260. That is, the first and second supporters 265 and 267 guide the lower fan 130 and the lower fan housing 220 to be spaced apart from the heater assembly 260.

The first supporter 265 includes a first supporter body 265a having an approximately ring shape and a first supporter frame 265c extending from one point to the other point of an inner circumferential surface of the first supporter body 265a. The first supporter frame 265c is provided in plurality, and the plurality of first supporter frames 265c may be disposed to cross each other.

A supporter central portion 265c is provided at a portion at which the plurality of first supporter frames 265c cross each other. A rotation central portion 267b of the second supporter 267 may be inserted into the supporter central portion 265b. Also, the bearing 275 may be provided on the supporter central portion 265b. In summary, the bearing 275 may be provided outside of the rotation central portion 267b to guide the rotation central portion 267b so that the rotation central portion 267b easily rotates within the supporter central portion 265b.

[Second Support]

The lower orifice 280, the heater assembly 260, and the first supporter 265 are fixed components. The second supporter 267 and components provided above the second support, i.e., the lower fan 230, the lower fan housing 220, and the upper orifice 240 may rotate (revolved).

The second supporter 267 includes a second supporter body 267a having an approximately ring shape and a second supporter frame 267c extending from one point of an inner circumferential surface of the second supporter body 267a to the central portion of the second supporter body 267a. The second supporter frame 267c is provided in plurality, and the plurality of second supporter frames 267c may meet each other at a central portion of the second supporter body 267a.

A rotation central portion 267b providing a rotational center of the second supporter 267 is provided at a center of the second supporter body 267a. The rotation central portion 267b provides a rotation central axis of the second supporter 267. Also, the rotation central portion 267b may protrude downward from the central portion of the second supporter body 267a and be rotatably inserted into the central portion 265b of the first supporter 265.

[Arrangement Structure of the Second Supporter and Locking Part]

A stepped part 267e that is recessed downward is disposed on a top surface of each of the plurality of second supporter frames 267c. The stepped part 267e has a shape corresponding to a stepped shape of the locking part 239. The stepped part 267e may be disposed below the locking part 239.

Figure 18:
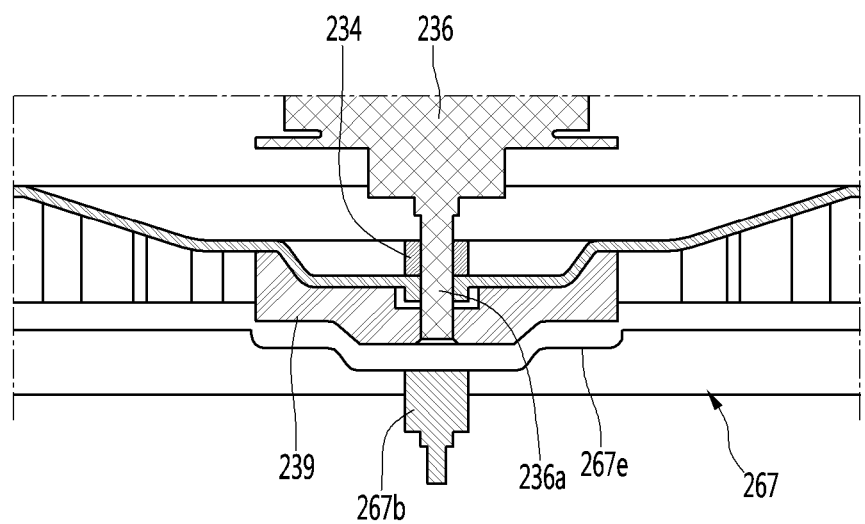
FIG. 18 is a cross-sectional view illustrating a configuration of the lower fan and a second support according to the first embodiment of the present invention.

In detail, referring to FIG. 18, the lower motor 236 is disposed above the lower fan 230 according to an embodiment of the present invention, and the lower motor shaft 236a extends downward from the bottom surface of the lower motor 236 and is coupled to the lower fan 230. The shaft coupling part 234 through which the lower motor shaft 236a passes is provided on the lower fan 230. The shaft coupling part 234 may protrude upward from the hub 231a of the lower fan 230.

The lower motor shaft 236a passes through the shaft coupling part 234 to protrude to a lower side of the lower fan 230 and is coupled to the locking part 239. A bottom surface of the locking part 239 may have a protruding or stepped shape corresponding to that of the hub 231a of the lower fan 230.

A stepped part 267e of the second supporter 267 may be disposed below the locking part 239. Thus, interference between the locking part 239 and the second supporter 267 may be prevented. Also, the bottom surface of the locking part 239 and the stepped part 267e of the second supporter 267 may be spaced a set distance S1 from each other. Due to this configuration, even though vibration occurs while the lower fan 230 is driven, the interference between the lower fan 230 or the locking part 239 and the second supporter 267 may be prevented.

[Air Flow in Upper Module]

Figure 19:
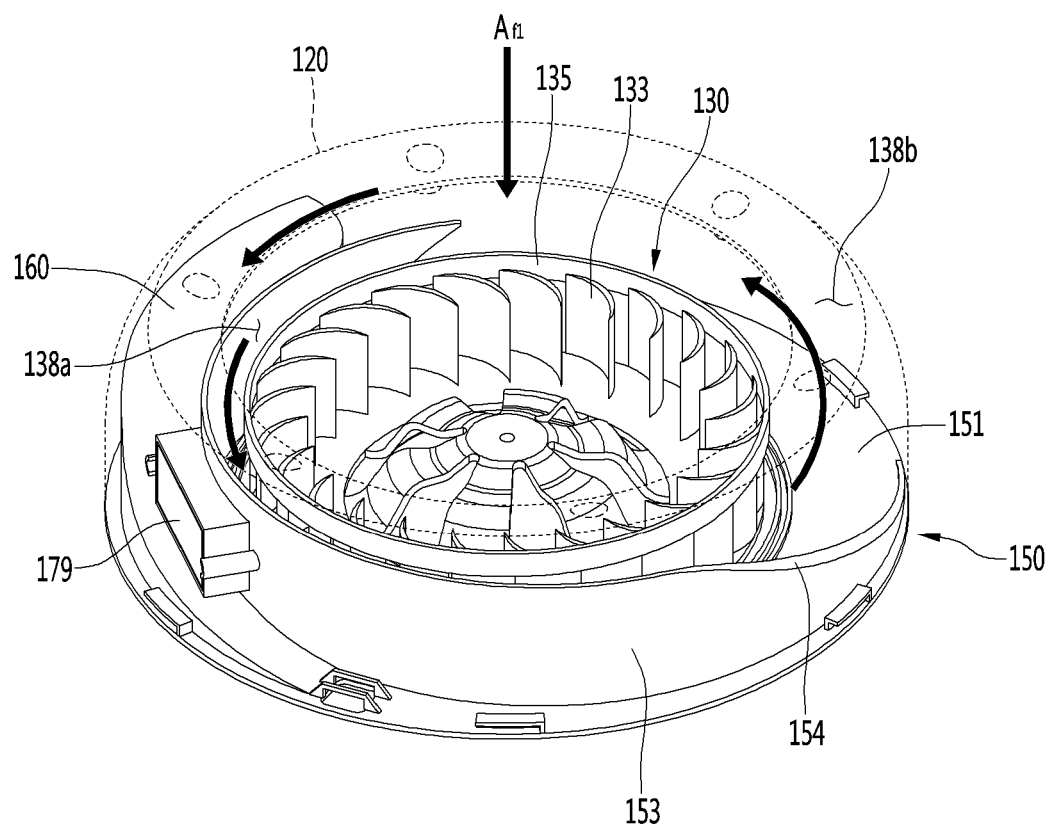
FIGS. 19 and 20 are views illustrating a state in which air passing through a fan is discharged from the upper module according to the first embodiment of the present invention.
Figure 20:
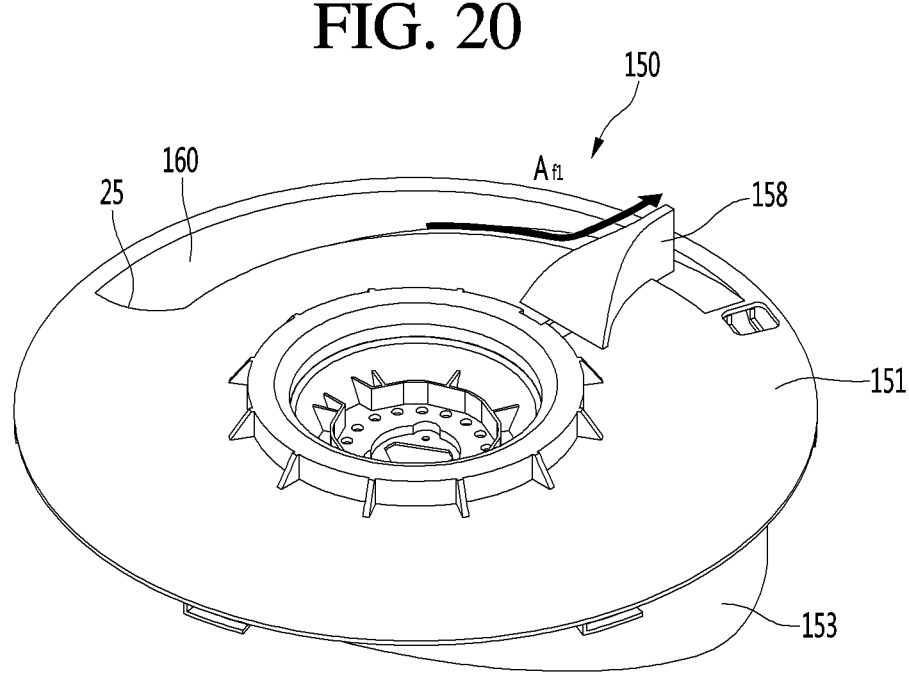

FIGS. 19 and 20 are views illustrating a state in which air passing through the fan is discharged from the upper module according to the first embodiment of the present invention.

Referring to FIGS. 2, 19, and 20, when the upper fan 130 according to the first embodiment of the present invention is driven, air may be suctioned through the first suction part 21 of the upper module 100 to pass through the upper fan 130 to generate a flow of air discharged from the first discharge part 25, i.e., a first air flow Af1.

In detail, as the upper fan 130 rotates, the air is suctioned through the first suction part 21 provided in the upper portion of the upper module 100. The air suctioned through the first suction part 21 is suctioned in the axial direction of the upper fan 130 via the first pre-filter 105.

The air introduced in the axial direction of the upper fan 130 may be discharged in the radial direction of the upper fan 130 and guided by the guide wall 153 of the upper fan housing 150 to flow while rotating in the circumferential direction along the first fan passage 138a. Also, the air passing through the first fan passage 183a may flow in the circumferential direction through the second fan passage 138b disposed in a downstream side of the first fan passage 138a.

The second fan passage 138b may have a flow cross-sectional area greater than that of the first fan passage 138a to reduce flow resistance of the air passing through the upper fan 130, thereby reducing noise generated from the upper fan 130.

The air flowing through the second fan passage 138b may be discharged to the first discharge part 25 to flow to the lower side of the housing plate 151. Here, the air discharged through the first discharge part 25 may flow in a direction of the second discharge part 27. Also, the air discharged from the first discharge part 25 may be guided by the flow guide part 160 to easily flow in the circumferential direction.

The air flowing along the flow guide part 160 may be changed in flow direction by the first discharge guide part 158 provided below the housing plate 151. In detail, the air flowing in the circumferential direction may meet the first discharge guide part 158 to flow in the outer radial direction. Here, the upper air guide 180 together with the first discharge guide part 158 may guide the air flow in the radial direction.

Due to this configuration, the air passing through the upper fan 130 is guided in the circumferential direction by the upper fan housing 150 and the upper cover 120 and then is discharged through the first discharge part 25 at rotation force. Also, the discharged air may be guided by the first discharge guide part 158 and the upper air guide 180 and thus be easily discharged in the radial direction.

The ionizer mounting part 168 in which an ionizer 179 for sterilizing microorganisms contained in the air is installed is provided outside the guide wall 153. The ionizer 179 may emit anions to the first fan passage 138a or the second fan passage 138b. Thus, the air passing through the upper module 100 may be sterilized through the ionizer 179, and thus, clean air may be supplied to the user.

[Air Flow in Lower Module]

Figure 21:
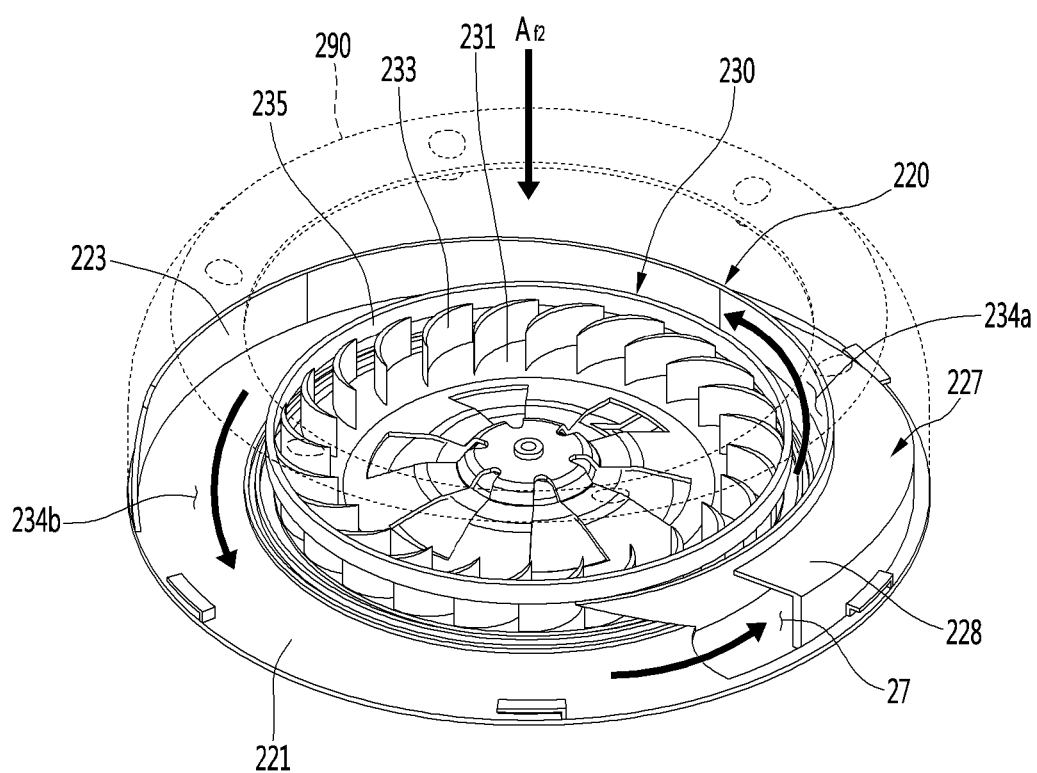
FIGS. 21 and 22 are views illustrating a state in which the air passing through the fan is discharged from the lower module according to the first embodiment of the present invention.
Figure 22:
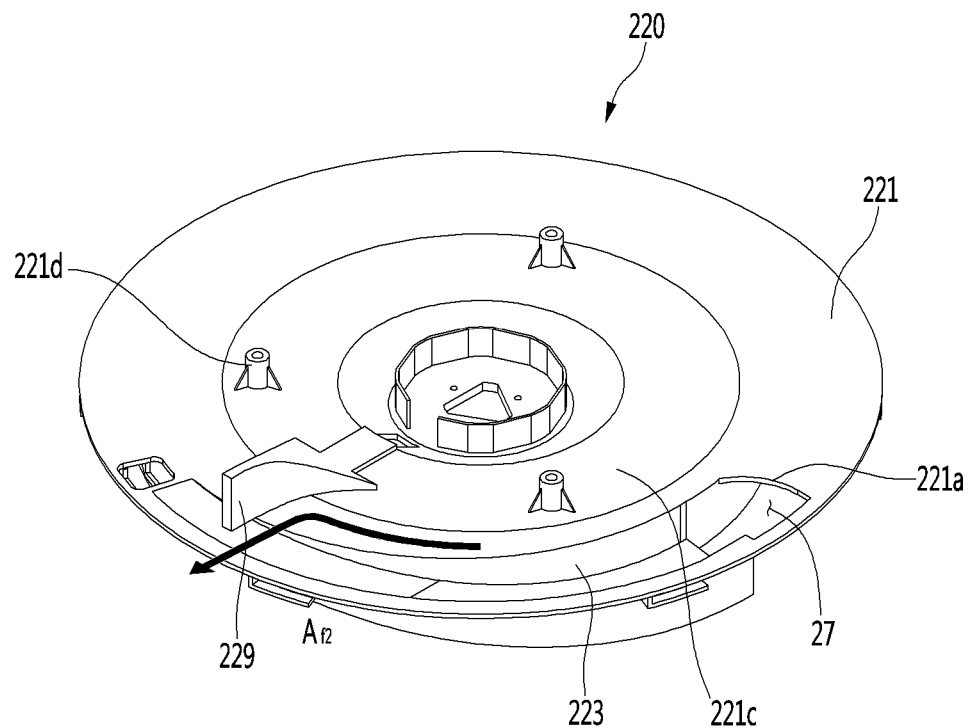
Figure 23:
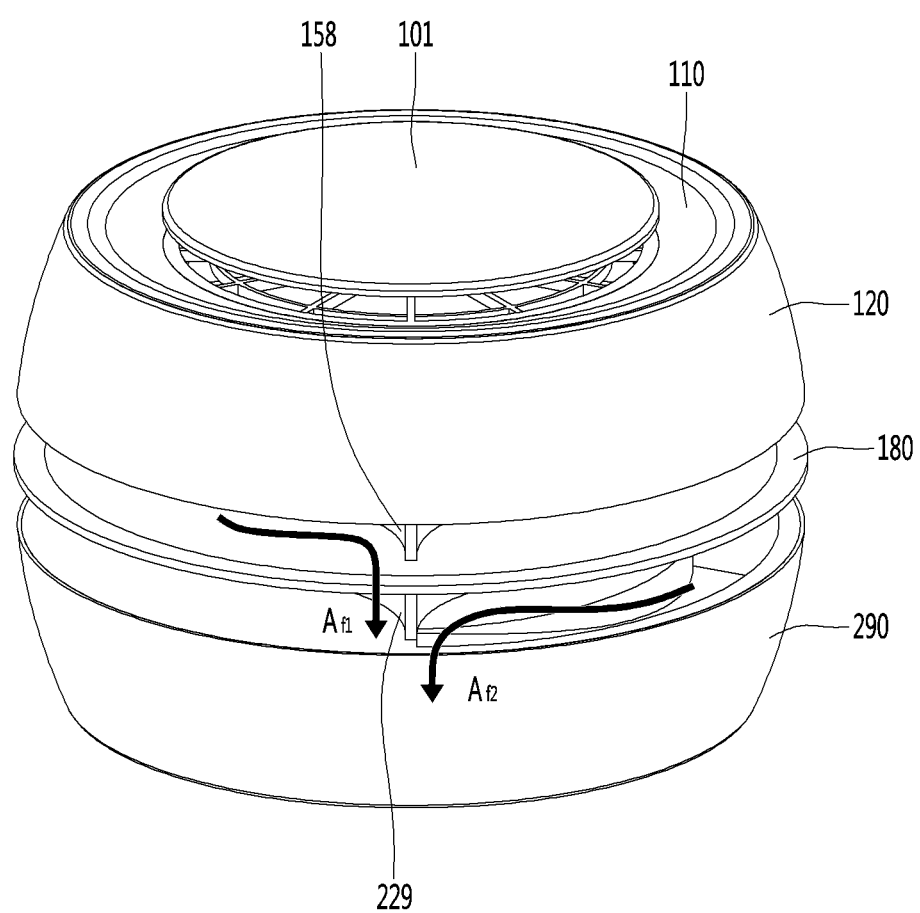
FIG. 23 is a view illustrating a flow of air discharged from the upper module and the lower module according to the first embodiment of the present invention.

FIGS. 21 and 22 are views illustrating a state in which the air passing through the fan is discharged from the lower module according to the first embodiment of the present invention, and FIG. 23 is a view illustrating a flow of air discharged from the upper module and the lower module according to the first embodiment of the present invention.

Referring to FIGS. 2, 21, and 22, when the lower fan 230 according to the first embodiment of the present invention is driven, air may be suctioned through the second suction part 23 of the upper module 200 to pass through the lower fan 230 to generate a flow of air discharged from the second discharge part 27, i.e., a second air flow Af2.

In detail, as the lower fan 230 rotates, the air is suctioned through the second suction part 23 provided in the lower portion of the lower module 200. The air suctioned through the second suction part 23 is suctioned in the axial direction of the lower fan 230 via the second pre-filter 295.

The air introduced in the axial direction of the lower fan 230 may be discharged in the radial direction of the lower fan 230 and guided by the guide wall 223 of the upper fan housing 220 to flow while rotating in the circumferential direction along the first fan passage 234a. Also, the air passing through the first fan passage 234a may flow in the circumferential direction through the second fan passage 234b disposed in a downstream side of the first fan passage 234a.

The second fan passage 234b may have a flow cross-sectional area greater than that of the first fan passage 234a to reduce flow resistance of the air passing through the lower fan 230, thereby reducing noise generated from the lower fan 230.

The air flowing through the second fan passage 234b may be discharged to the second discharge part 27 to flow to the lower side of the housing plate 221. Here, the air discharged through the second discharge part 27 may flow in a direction of the first discharge part 25. Also, the air discharged from the second discharge part 27 may be guided by the flow guide part 227 to easily flow in the circumferential direction.

The air flowing along the flow guide part 227 may be changed in flow direction by the second discharge guide part 229 provided above the housing plate 221. In detail, the air flowing in the circumferential direction may meet the second discharge guide part 229 to flow in the outer radial direction. Here, the lower air guide 210 together with the second discharge guide part 229 may guide the air flow in the radial direction.

Due to this configuration, the air passing through the lower fan 230 is guided in the circumferential direction by the lower fan housing 220 and the lower cover 290 and then is discharged through the second discharge part 27 at rotation force. Also, the discharged air may be guided by the second discharge guide part 229 and the upper air guide 210 and thus be easily discharged in the radial direction.

[Intensive Discharge of Air Passing Through First and Second Discharge Parts]

Referring to FIG. 23, the second discharge part 27 may be disposed to face the first discharge part 25 with respect to the air guides 180 and 210. Also, the air flowing to the second discharge part 27 may be discharged in the direction of the first discharge part 25. In other words, first air discharged from the first discharge part 25 and second air discharged from the second discharge part 27 may flow to be close to each other.

Also, the air discharged from the first discharge part 25 may be guided by the first discharge guide part 158 and the upper air guide 180 and then disposed to the first discharge passage 26, and the air discharged from the second discharge part 27 may be guided by the second discharge guide part 229 and the lower air guide 229 and then disposed to the second discharge passage 28.

Here, the first discharge guide part 229 may be disposed directly below the first discharge guide part 158 to concentrate the air flowing through the first and second discharge passages 26 and 28, thereby discharging the air to the outside. Due to this configuration, a flow pressure acting on the flow generator 10 may be uniform to reduce the vibration or noise of the flow generator 10.

The air discharged through the second discharge part 27 may be easily discharged to the second discharge passage 28 in the radial direction by the second flow guide part 227 and the second discharge guide part 229.

The lower module 200 further include the heater assembly 260 for heating the air passing through the lower module 200. The heater assembly 260 is disposed at a suction-side of the second blower fan 230, and the air heated by the heater assembly 260 passes through the second blower fan 230. Due to the heater assembly 260, warm air may be supplied to the user. Also, since the heater assembly 260 is provided in the lower module 200, the heat generated from the heater assembly 260 may easily act on the air flowing upward.

[Flow Direction of Air Passing Through First and Second Discharge Parts]

The rotation direction of the upper fan 130 and the rotation direction of the lower fan 230 may be opposite to each other.

For example, when the flow generator 10 is viewed from an upper side, the air discharged from the first discharge part 25 rotates in one direction of a clockwise direction and a counterclockwise direction. On the other hand, the air discharged from the second discharge part 27 rotates in the other direction of the clockwise direction and the counterclockwise direction.

Thus, the air discharged to the lower side of the upper fan housing 150 by passing through the upper fan 130 may be guided by one side surface of the first discharge guide part 158 and discharged in the radial direction. On the other hand, the air discharged to the upper side of the lower fan housing 220 by passing through the lower fan 230 may be guided by one side surface of the second discharge guide part 229 and discharged in the radial direction.

For example, when the air passing through the upper fan 130 moves to the first discharge guide part 158 while rotating in the clockwise direction, the air is guided by a right surface of the first discharge guide part 158 and discharged in the radial direction. Also, when the air passing through the lower fan 230 moves to the second discharge guide part 229 while rotating in the counterclockwise direction, the air is guided by a left surface of the second discharge guide part 229 and discharged in the radial direction.

On the other hand, when the air passing through the upper fan 130 moves to the first discharge guide part 158 while rotating in the counterclockwise direction, the air is guided by the left surface of the first discharge guide part 158 and discharged in the radial direction. Also, when the air passing through the lower fan 230 moves to the second discharge guide part 229 while rotating in the clockwise direction, the air is guided by a right surface of the second discharge guide part 229 and discharged in the radial direction.

Due to this configuration, the air flow direction generated in the upper module 100 and the air flow direction generated in the lower module 200 may be opposite to each other. Thus, the vibration occurring in the flow generator 10 due to the air flow may be offset. As a result, the vibration and noise of the flow generator 10 may be reduced.

DEFINITION OF TERMS

The upper module 100 and the lower module 200 may be called a "first module" and a "second module", respectively. The upper fan 130, the upper fan housing 150, the upper air guide 180, and the upper cover 120, which are provided in the upper module 100, may be called a "first fan", a "first fan housing", a "first air guide", and a "first cover", respectively. Also, the lower fan 230, the lower fan housing 220, the lower air guide 210, and the lower cover 290, which are provided in the lower module 200, may be called a "second fan", a "second fan housing", a "second air guide", and a "second cover", respectively.

[Rotation Effect of Flow Generator]

Figure 24:
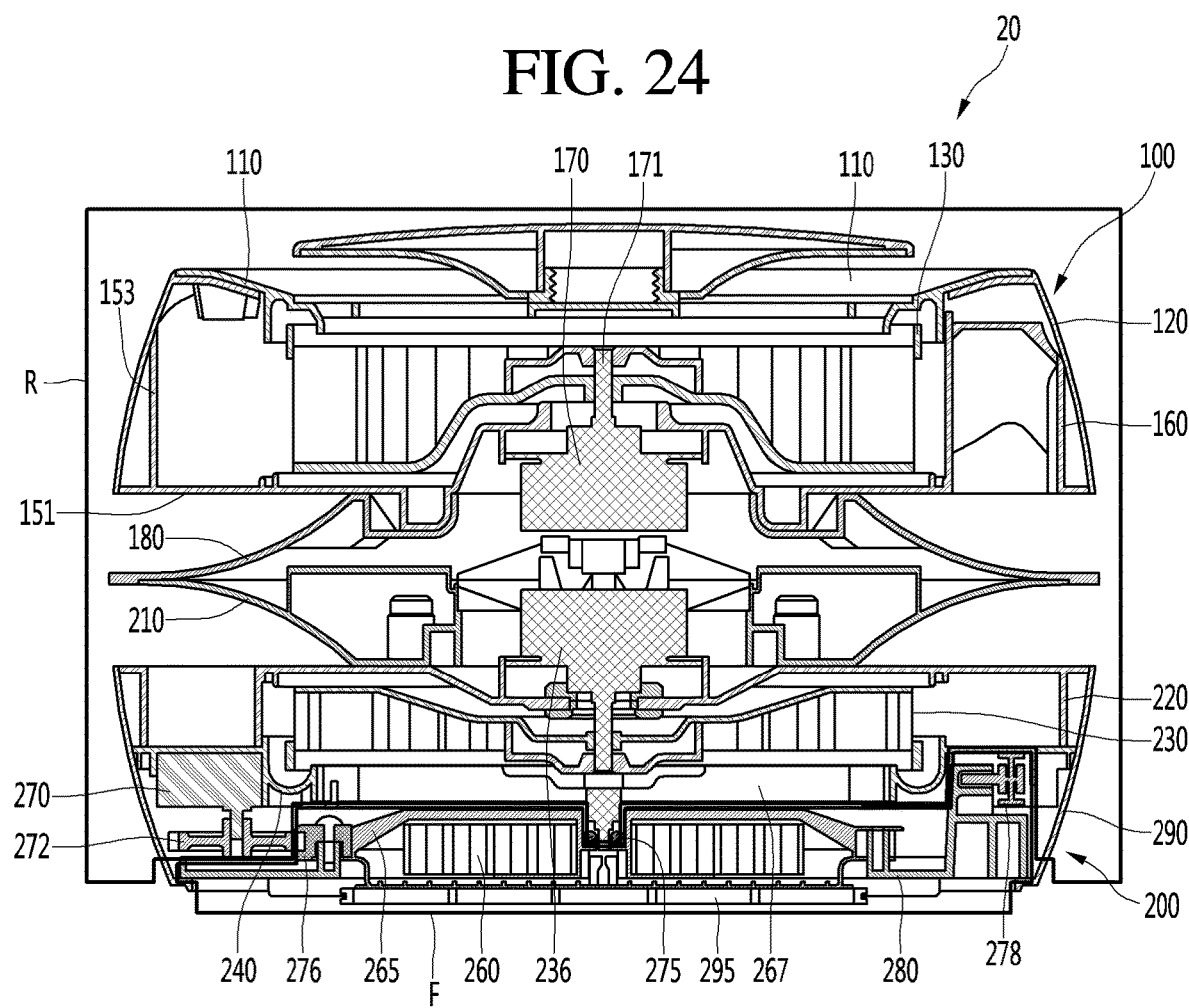
FIG. 24 is a cross-sectional view illustrating a portion F to which a flow generator is fixed and a rotatable portion R according to the first embodiment of the present invention.

FIG. 24 is a cross-sectional view illustrating a portion F to which a flow generator is fixed and a rotatable portion R according to the first embodiment of the present invention.

Referring to FIG. 24, the flow generator 10 according to the first embodiment of the present invention may include a device fixed part F fixed to one position and a device rotatable part R moving while rotating. The device rotatable part R may rotate a clockwise direction or a counterclockwise direction with respect to the axial direction.

The device fixed part F includes the lower orifice 280, the rack gear 276, and the heater assembly 260 of the lower module 100. Also, the device rotatable part R may be understood as the upper module 100 and the remaining components except for the fixed portion R of the lower module 100.

[Control Unit]

Figure 25:
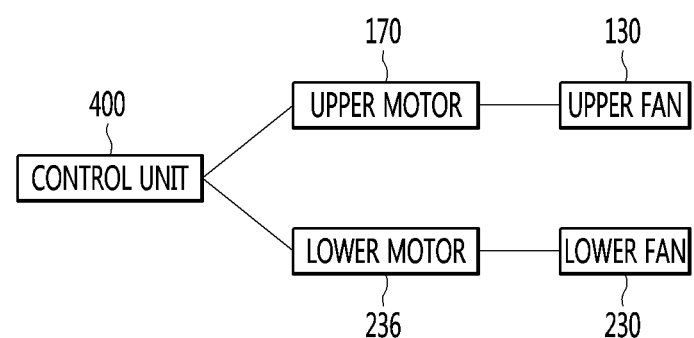
FIG. 25 is a block diagram illustrating connection of a control unit of the flow generator according to the first embodiment of the present invention.

FIG. 25 is a block diagram illustrating connection of a control unit of the flow generator according to the first embodiment of the present invention.

Referring to FIG. 25, the flow generator 10 according to an embodiment of the present invention may further include a control unit 400. In detail, the control unit 400 may be understood as a PCB device on which the main PCB 215 is disposed.

The control unit 400 may adjust rotational speeds of the upper fan 130 and the lower fan 230. In detail, the control unit 400 may be connected to the upper motor 170 and the lower motor 236 to control the number of revolution (revolution per minute: RPM) of each of the upper motor 170 connected to the upper fan 130 and the lower motor 236 connected to the lower fan 230.

The control unit 400 may control the revolution number of the upper motor 170 and the revolution number of the lower motor 236 to adjust a vertical direction of a flow of air discharged from the main body 20.

[Definition of Third Airflow]

A first airflow, a second airflow, and a third airflow may be generated in the main body 20 according to an embodiment of the present invention.

The first airflow may be understood as a first air flow Af1, and the second airflow may be understood as a second air flow Af2.

In summary, the first airflow may be defined as an airflow in which air disposed above the main body 20 is introduced through the first suction part 21 disposed above the upper module 100 and then discharged through the first discharge part 25. In more detail, the first airflow may be understood as an airflow in which, when the upper fan 130 rotates by the upper motor 170, air is introduced into an upper end of the first suction part 21, and the introduced air flows downward by the upper fan 130 and then discharged to a lower end of the upper module 100 through the first discharge part 25.

Also, the second airflow may be defined as an airflow in which air disposed below the main body 20 is introduced through the second suction part 23 disposed below the upper module 200 and then discharged through the second discharge part 27. In more detail, the second airflow may be understood as an airflow in which, when the lower fan 230 rotates by the lower motor 236, air is introduced into a lower end of the second suction part 23, and the introduced air flows upward by the lower fan 230 and then discharged to an upper end of the lower module 200 through the second discharge part 27.

In this case, the first airflow and the second airflow may flow close to each other in directions facing each other. The direction of the first airflow and the direction of the second airflow may flow in directions that are close to each other, i.e., in a central direction of the main body 20.

When the first airflow and the second airflow are discharged to the outside of the main body 20, i.e., are discharged by converting a flow direction of air into an outer radial direction through the upper air guide 180 and the lower air guide 210, the first airflow and the second airflow may be mixed to be discharged.

In detail, when the first discharge part 25 and the second discharge part 27 are disposed to vertically face each other, the first airflow discharged to the lower end of the upper module 100 and the second airflow discharged to the upper end of the lower module 200 may be changed in flow direction by the air guides 180 and 210 and be mixed with each other and then discharged to the outside of the main body. In this case, the airflow in which the first airflow and the second airflow are mixed with each other may be defined as the third airflow.

Also, the vertical direction of the third airflow discharged to the outside may be determined according to a difference in intensity of the first airflow and the second airflow.

The third airflow may be generated only when the first airflow and the second airflow are discharged in the same discharge. Thus, in an embodiment of the present invention, the first discharge part 25 and the second discharge part 27 may be disposed to face each other with respect to the air guides 180 and 210.

[Upward Operation]

Figure 26:
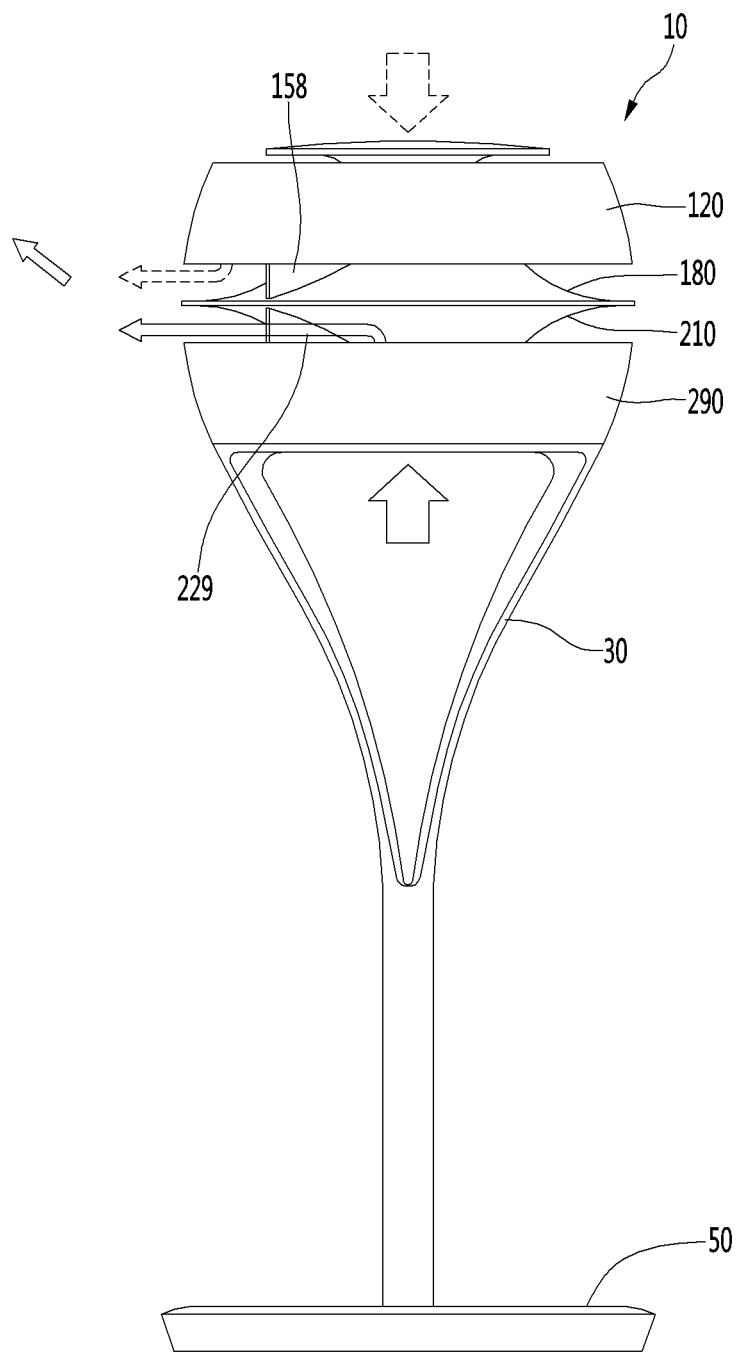
FIG. 26 is a view illustrating an upward operation of the flow generator according to the first embodiment of the present invention.

FIG. 26 is a view illustrating an upward operation of the flow generator according to the first embodiment of the present invention.

Referring to FIG. 26, in the upward operation, in order to discharge the third airflow to an upper side of the air guides 180 and 210, the control unit 400 may control the rotational speed of the lower fan 230 so that a flow rate of air discharged through the discharge part in the second airflow (solid line) is greater than that in the first airflow (dotted line).

In more detail, the control unit 400 may control the revolution number of the lower motor 236 to allow the revolution number of the lower motor 236 to be greater than that of the upper motor 170 so that a flow rate of air discharged to the second discharge part 27 by the lower fan 230 is greater than that of air discharged to the first discharge part 25 by the upper fan 130, and thus, the third airflow may be discharged to the upper side of the air guides 180 and 210.

Also, the rotational speeds of the lower fan 230 and the upper fan 130 in the upward operation may be previously set to be stored in a storage unit in a table type. Thus, when the lower fan 230 has a size less than that of the upper fan 130, a flow rate of air discharged from the upper fan 130 is greater than that of air discharged from the lower fan 230 at the same fan rotational speed. Thus, the control unit 400 reads the rotational speed of the lower fan 230 and the rotational speed of the upper fan 130, which are previously set from the storage unit to control the respective fan speeds so that the flow rate by the lower fan 230 is greater than that by the upper fan 130.

For example, the control unit 400 may control the rotational speed of the upper motor 170 and the rotational speed of the lower motor 236 so that a ratio of the rotational speeds is about 1:2 so that the third airflow is discharged to the upper side of the air guides 180 and 210. In detail, the control unit 400 may control the rotational speeds of the upper fan 130 and the lower fan 230 so that the upper fan 130 has a rotational speed of 600 rpm, and the lower fan 230 has a rotational speed of 1,300 rpm.

The rotational speeds, the number of revolutions and the rotation ratio are merely examples and may vary depending on the type of used motor, the size of the fan, and the like.

Thus, when the first airflow generated in the upper module 100 by the upper fan 130 has an intensity less than that of the second airflow generated in the lower module 200 by the lower fan 230, the second airflow discharged through the air guides 180 and 280 may push the first airflow upward. Thus, the third airflow in which the first airflow and the second airflow are mixed with each other may be discharged to the upper side of the air guides 180 and 210.

[Downward Operation]

Figure 27:
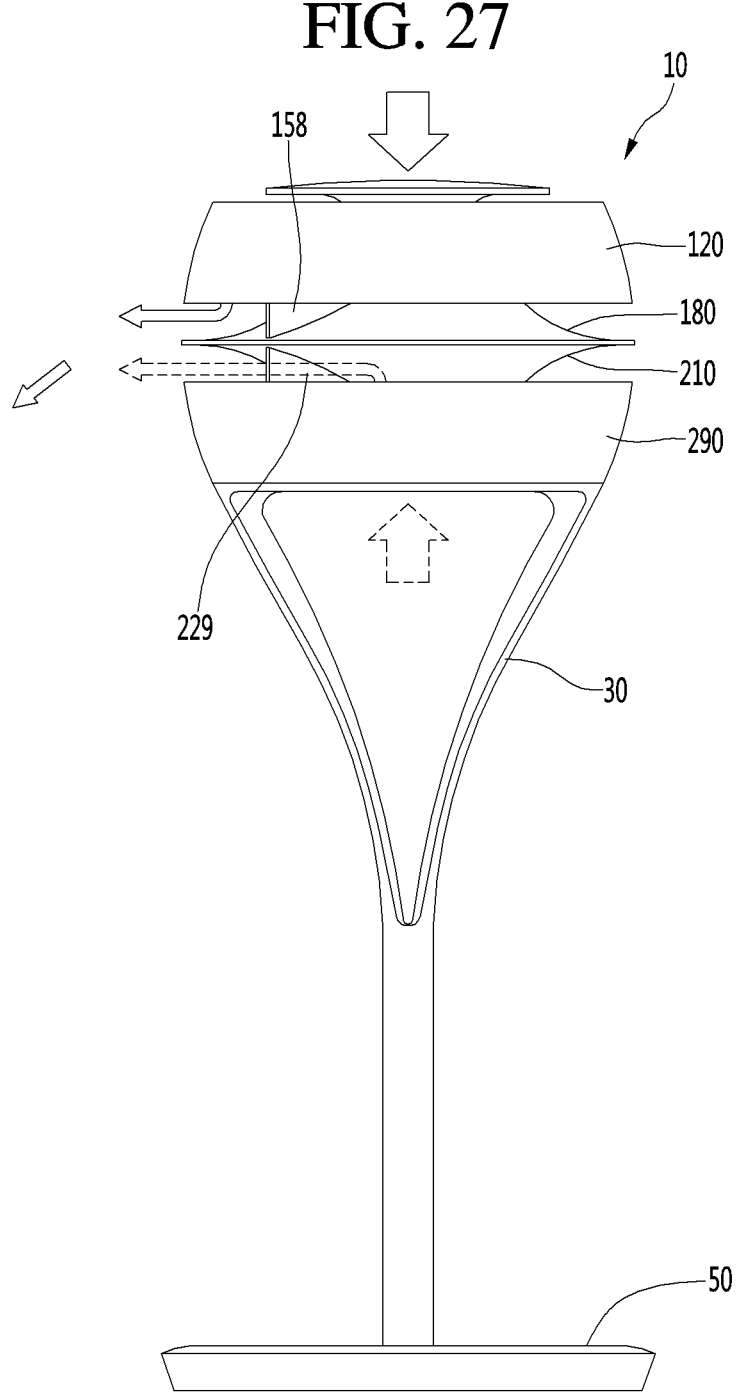
FIG. 27 is a view illustrating a downward operation of a flow generator according to an embodiment of the present invention.

FIG. 27 is a view illustrating a downward operation of the flow generator according to an embodiment of the present invention.

Referring to FIG. 27, in the downward operation, in order to discharge the third airflow to a lower side of the air guides 180 and 210, the control unit 400 may control the rotational speed of the upper fan 130 so that a flow rate of air discharged through the discharge part in the first airflow (solid line) is greater than that in the second airflow (dotted line). That is, the rotational speed of the upper fan 130 may be adjusted to be greater than that of the lower fan 230.

The control unit 400 may control the revolution number of the upper motor 170 to allow the revolution number of the upper motor 170 to be greater than that of the lower motor 236 so that a flow rate of air discharged to the first discharge part 25 by the upper fan 130 is greater than that of air discharged to the second discharge part 27 by the lower fan 230, and thus, the third airflow may be discharged to the lower side of the air guides 180 and 210.

Also, the rotational speeds of the lower fan 230 and the upper fan 130 in the downward operation may be previously set to be stored in a storage unit in a table type. Thus, when the lower fan 230 has a size less than that of the upper fan 130, a flow rate of air discharged from the upper fan 130 is greater than that of air discharged from the lower fan 230 at the same fan rotational speed. Thus, the control unit 400 reads the rotational speed of the lower fan 230 and the rotational speed of the upper fan 130, which are previously set from the storage unit to control the respective fan speeds so that the flow rate by the upper fan 130 is greater than that by the lower fan 230.

For example, the control unit 400 may control the rotational speed of the upper motor 170 and the rotational speed of the lower motor 236 so that a ratio of the rotational speeds is about 2:1 so that the third airflow is discharged to the lower side of the air guides 180 and 210. In detail, the control unit 400 may control the rotational speeds of the upper fan 130 and the lower fan 230 so that the upper fan 130 has a rotational speed of 1,200 rpm, and the lower fan 230 has a rotational speed of 650 rpm.

The rotational speeds, the number of revolutions, and the rotation ratio are merely examples and may vary depending on the type of used motor, the size of the fan, and the like.

Thus, when the first airflow generated in the upper module 100 by the upper fan 130 has an intensity greater than that of the second airflow generated in the lower module 200 by the lower fan 230, the first airflow discharged through the air guides 180 and 210 may push the second airflow downward. Thus, the third airflow formed by the first airflow and the second airflow may be discharged to the lower side of the air guides 180 and 210.

[Reciprocating Operation]

Figure 28:
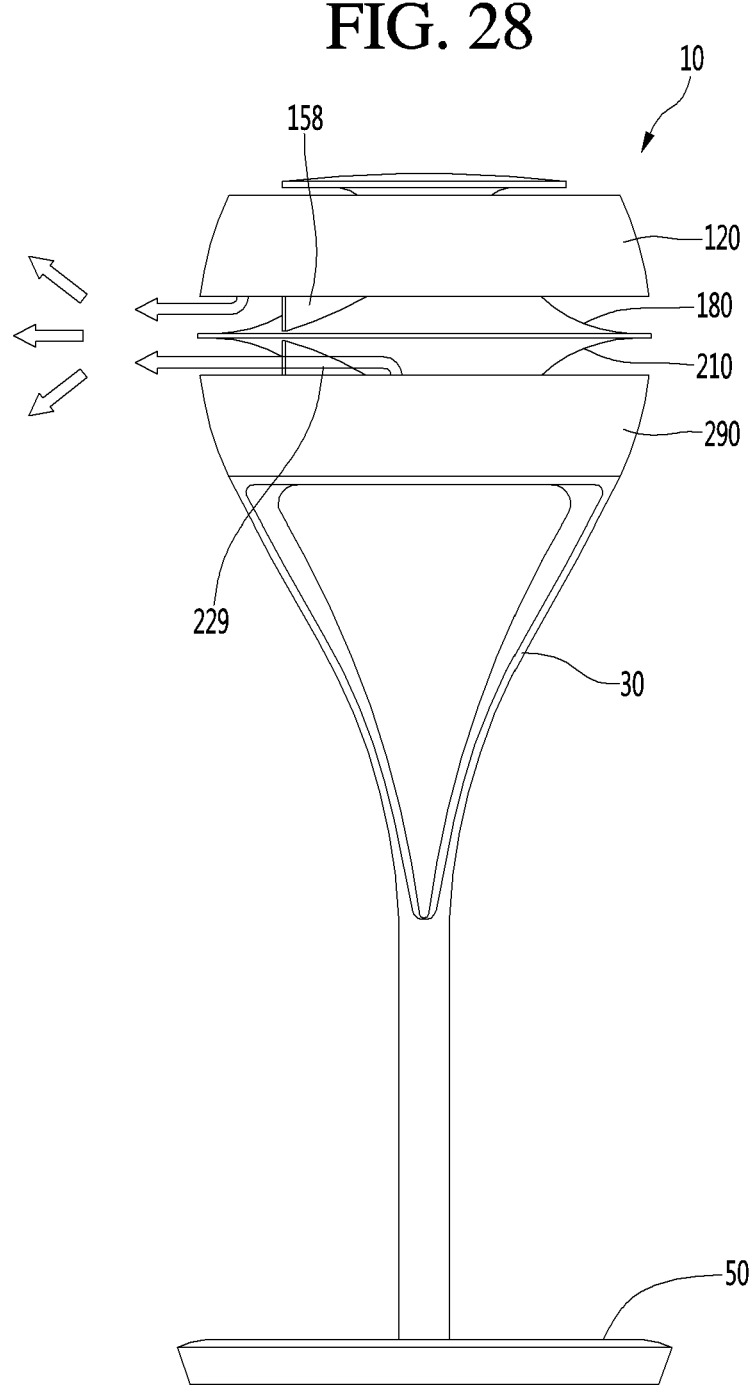
FIG. 28 is a view illustrating a reciprocating operation of the flow generator according to an embodiment of the present invention.

FIG. 28 is a view illustrating a reciprocating operation of the flow generator according to an embodiment of the present invention.

Referring to FIG. 28, the control unit 400 may constantly vary the revolution number of the upper motor 170 and the revolution number of the lower motor 236 to change the vertical direction of the third airflow discharged from the main body 20 according to a time.

In detail, the control unit 400 may vary the revolution number of the upper motor 170 within a predetermined first set range and may vary the revolution number of the lower motor 236 within a predetermined second set range.

In more detail, the control unit 400 may gradually increase the revolution number of the upper motor 170 from a minimum value to a maximum value of the first set range or may gradually decrease the revolution number of the upper motor 170 from a maximum value to a minimum value of the first set range. Similarly, the control unit 400 may gradually increase the revolution number of the lower motor 236 from a minimum value to a maximum value of the second set range or may gradually decrease the revolution number of the lower motor 236 from a maximum value to a minimum value of the second set range.

Also, the control unit 400 may alternately repeat the increases and decrease of the revolution number of the upper motor 170 and the revolution number of the lower motor 236 to perform the reciprocating operation.

In detail, the control unit 400 may control the third airflow discharged from the main body 20 through the reciprocating operation in which the revolution number of the upper motor 170 and the revolution number of the lower fan motor 236 increase or decrease in inverse proportion to each other and may be discharged while reciprocating in the upper and lower directions of the air guides 180 and 210.

That is, in the reciprocating operation, the third airflow discharged from the main body 20 may be discharged while reciprocating in the upper and lower sides of the air guides. Thus, an air-conditioning effect in the space in which the flow generator is installed may be improved, and also, a plurality of users may feed comfort by the third airflow.

Also, the reciprocating operation may be performed by alternately performing a first reciprocating operation and a second reciprocating operation.

[First Reciprocating Operation]

Figure 29:
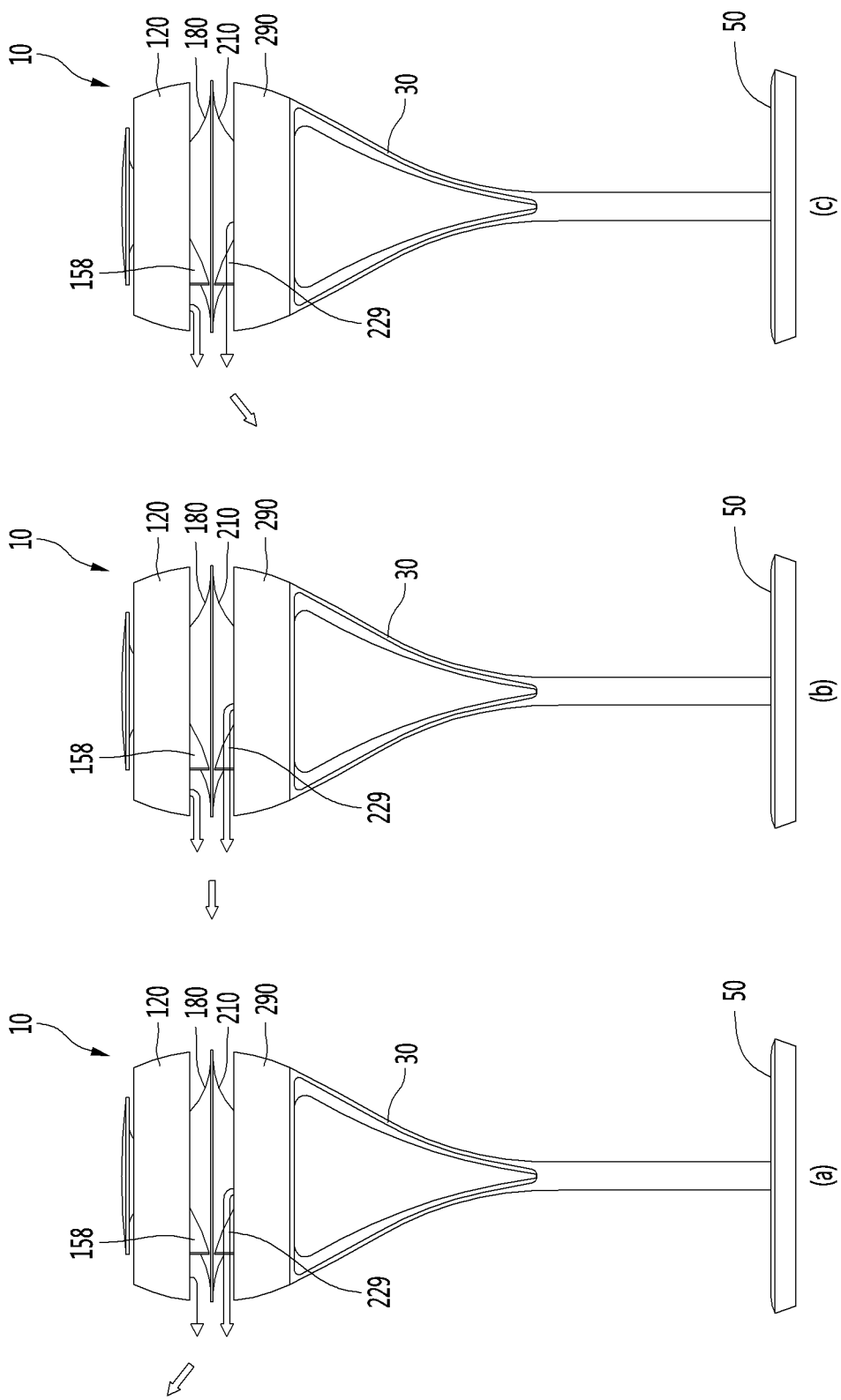
FIG. 29 is a view illustrating a first reciprocating operation of the flow generator according to an embodiment of the present invention.

FIG. 29 is a view illustrating the first reciprocating operation of the flow generator according to an embodiment of the present invention.

Referring to FIG. 29, the control unit 400 may gradually increase the revolution number of the upper motor 170 from the minimum value to the maximum value of the first set range and also gradually decrease the revolution number of the lower motor 236 from the maximum value to the minimum value to perform the first reciprocating operation.

In the first reciprocating operation, the direction of the third airflow may be changed at a constant rate from the upper side to the lower side of the air guides 180 and 210.

In the following description, an example in which the first set range (upper fan) is 600 rpm to 1,200 rpm, and the second set range (lower fan) is 650 rpm to 1,300 rpm will be described.

For example, referring to FIG. 29(a), the control unit 400 may control the rotational speed of the upper fan 130 to 600 rpm that is the minimum value of the first set range and the rotational speed of the lower fan 230 to 1,300 rpm that is the maximum value of the second set range. In this case, since the second airflow has an intensity greater than that of the first airflow, the third airflow discharged from the main body 20 may flow to the upper side of the air guides 180 and 210.

In this state, the control unit 400 may increase the rotational speed of the upper fan 130 up to 1,200 rpm that is the maximum value of the first set range at a constant rate and also decrease the rotational speed of the lower fan 230 up to 650 rpm that is the minimum value of the second set range at a constant rate so as to be controlled to the first reciprocating operation.

For example, the control unit 400 may increase the rotational speed of the upper fan 130 to 900 rpm and decrease the rotational speed of the lower fan 230 to 970 rpm to allow the first airflow and the second airflow to have the same intensity so that the main body 20 operates in the state (a) to (b) of FIG. 29. Thus, the third airflow may be discharged in an outer radial direction (or a horizontal direction) of the air guides 180 and 210. Here, since the upper fan 130 has a size greater than that of the lower fan 230, the rotational speed of the lower fan 230 is controlled to be greater than the rotational speed of the upper fan 130 so that the airflows are the same. As a result, the revolution number of each of the lower motor 236 and the upper motor 170 may be previously set to be stored.

The control unit 400 may increase the rotational speed of the upper fan 130 to 1,200 rpm and decrease the rotational speed of the lower fan 230 to 650 rpm to allow the intensity of the first airflow to be greater than that of the second airflow so that the main body 20 operates in the state (b) to (c) of FIG. 29. Thus, the third airflow may be discharged to the lower side of the air guides 180 and 210.

That is, the control unit 400 may control the revolution number of each of the upper motor 170 and the lower motor 236 so that the direction of the third airflow is constantly changed from the upper side to the lower side of the air guides 180 and 210 of the main body 20 in the order of (a), (b), (c) of FIG. 29.

Alternatively, the rotational speed of the upper motor 170 may gradually decrease from the maximum value to the minimum value of the first set range, and also, the rotation speed of the lower motor 236 may gradually increase from the minimum value to the maximum value of the second set range so that the reciprocating operation is performed by changing the vertical reciprocating order.

[Second Reciprocating Operation]

FIG. 29 is a view illustrating a second reciprocating operation of the flow generator according to an embodiment of the present invention.

Figure 30:
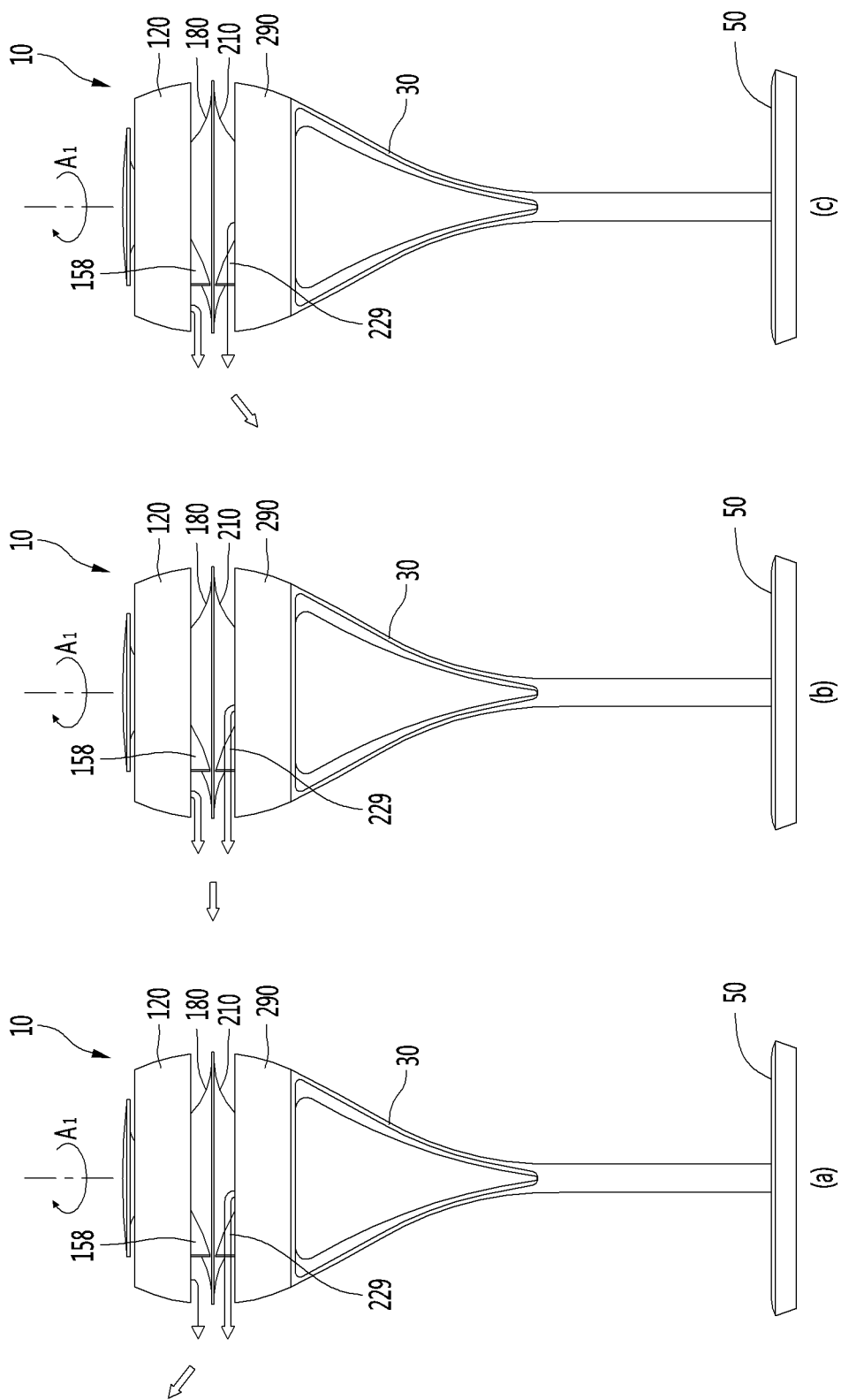

Referring to FIG. 30, in the second reciprocating operation, like the first reciprocating operation, the control unit 400 may gradually increase the rotational speed of the upper motor 130 from the minimum value to the maximum value of the first set range and also gradually decrease the rotational speed of the lower motor 230 from the maximum value to the minimum value to perform the reciprocating operation. Simultaneously, as described above, in the second reciprocating operation, the rotary motor 270 may be driven so that the upper module 100 and the lower module 200 integrally rotate by an interlocking operation of the pinion gear 272 and the rack gear 276.

The description with respect to the rotation operations of the upper module 100 and the lower module 200 may be derived from that of the above-described driving device.

That is, the control unit 400 may control the revolution number of each of the upper motor 170 and the lower motor 236 so that the direction of the third airflow is constantly changed from the upper side to the lower side of the air guides 180 and 210 in the order of (a), (b), and (c) of FIG. 30, and simultaneously, the control unit 400 may control the driving of the rotary motor 270 so that the lower module 200 rotates in a clockwise direction A1 or a counterclockwise direction.

Also, since the first reciprocating operation and the second reciprocating operation are alternately performed, the discharge direction of the third airflow may be controlled to a direction that is desired by the user.

In this case, the first set range and the second set range may be derived from the above-described set range. This is done for equally maintaining the upward inclined angle and the downward inclined angle of the third airflow.

Also, the control unit 400 may constantly maintain a changing rate of the revolution number of the upper motor 170 and a changing rate of the revolution number of the lower motor 236. This is done for constantly maintaining the upward and downward reciprocating speeds of the third airflow discharged from the main body 20.

Also, the control unit 400 may control the revolution number of each of the upper motor 170 and the lower motor 236 so that the sum of the revolution number of the upper motor 170 and the revolution number of the lower motor 236 is equally maintained, thereby constantly maintaining the intensity of the third airflow discharged from the main body 20.

Also, when the revolution number of the upper motor 170 and the revolution number of the lower motor 236 gradually increase, the intensity of the discharge of the third airflow may increase. This is because the rotational speeds of the upper fan 130 and the lower fan 230 increase when the revolution number of each of the upper motor 170 and the lower motor 236 increases.

On the other hand, when the revolution number of the upper motor 170 and the revolution number of the lower motor 236 gradually decrease, the intensity of the discharge of the third airflow may decrease.

For example, when the sum of the revolution number of the upper motor 170 and the revolution number of the lower motor 236 is 3,000 rpm in comparison to a case in which the sum of the revolution number of the upper motor 170 and the revolution number of the lower motor 236 is 1,500 rpm, the intensity of the third airflow may increase by a factor of two.

That is, the control unit 400 may control the discharge intensity of the third airflow by increasing or decreasing the revolution number of the upper motor 170 and the revolution number of the lower motor 236.

In the flow generator using the axial flow fan according to the related art, the discharge airflow on the flow structure which faces the airflow toward the user may be artificially felt, and the device itself may rotate in the natural wind mode in which the distribution and speed of the discharge airflow are changed, and also, the rotational speed of the blade has to be changed.

As described above, the flow generator according to the related art may have a disadvantage in that the power consumption relatively increases due to the rotation of the device itself in the natural wind mode, and the user may experience an artificial wind rather than the natural wind to deteriorate satisfaction.

To solve the above problem, the flow generator 10 according to an embodiment of the present invention may maximally simulate the natural wind by reflecting the characteristics of the natural wind in the natural wind mode. In this regard, the natural wind mode according to an embodiment of the present invention will be described below in detail.

Figure 31:
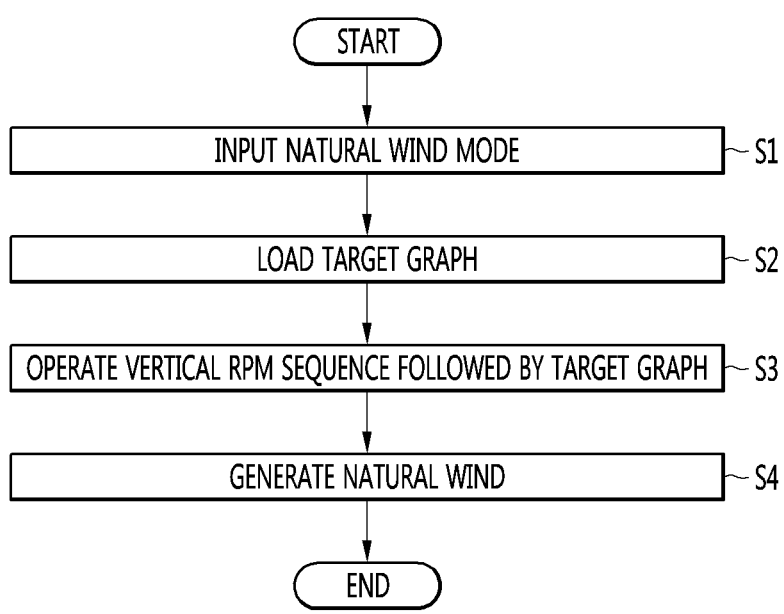
FIG. 31 is a flowchart illustrating a method for controlling natural wind generation of the flow generator according to an embodiment of the present invention.
Figure 32:
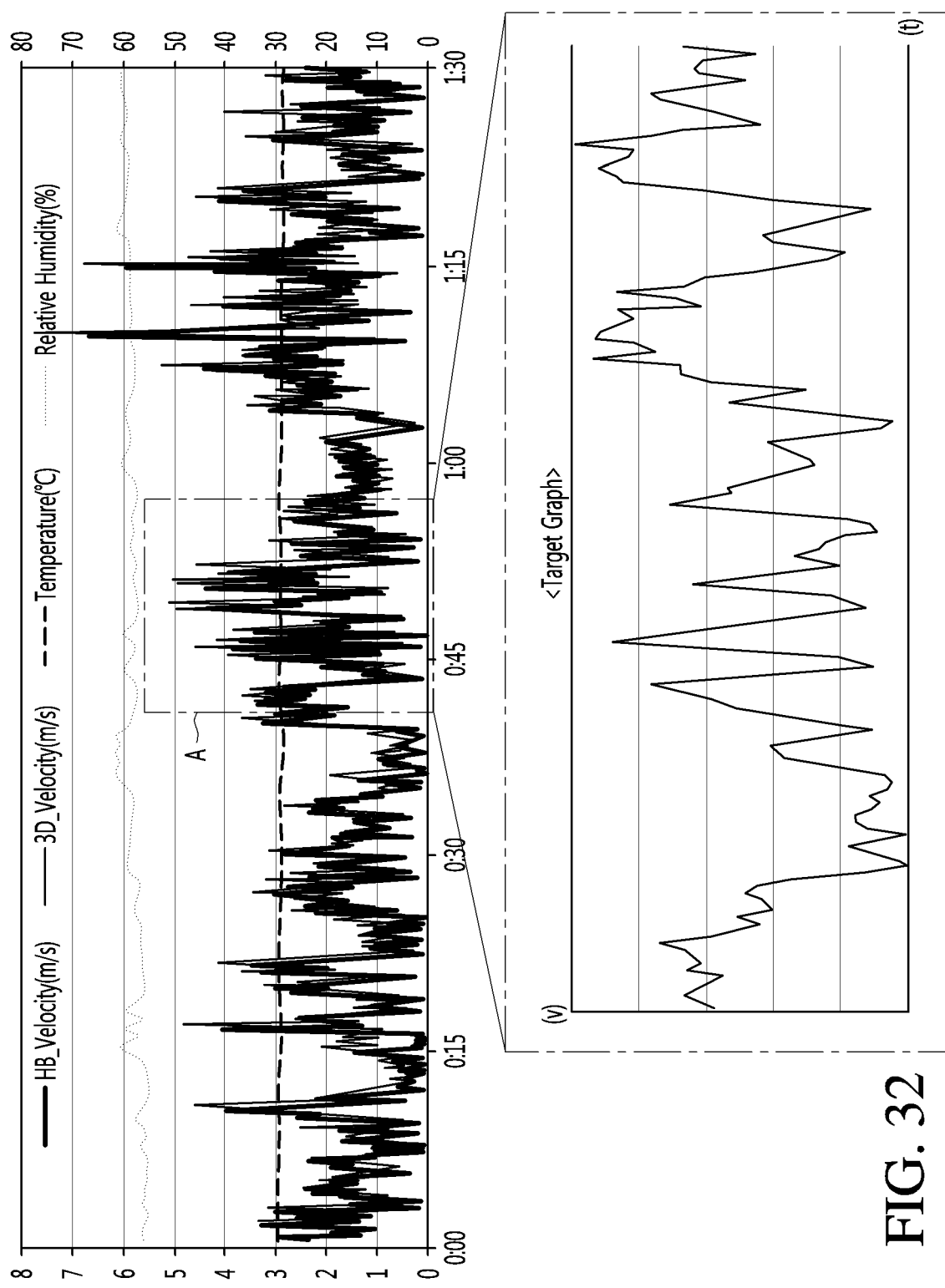
FIG. 32 is a view illustrating an example of a target graph for generating natural wind in the flow generator according to an embodiment of the present invention.
Figure 33:
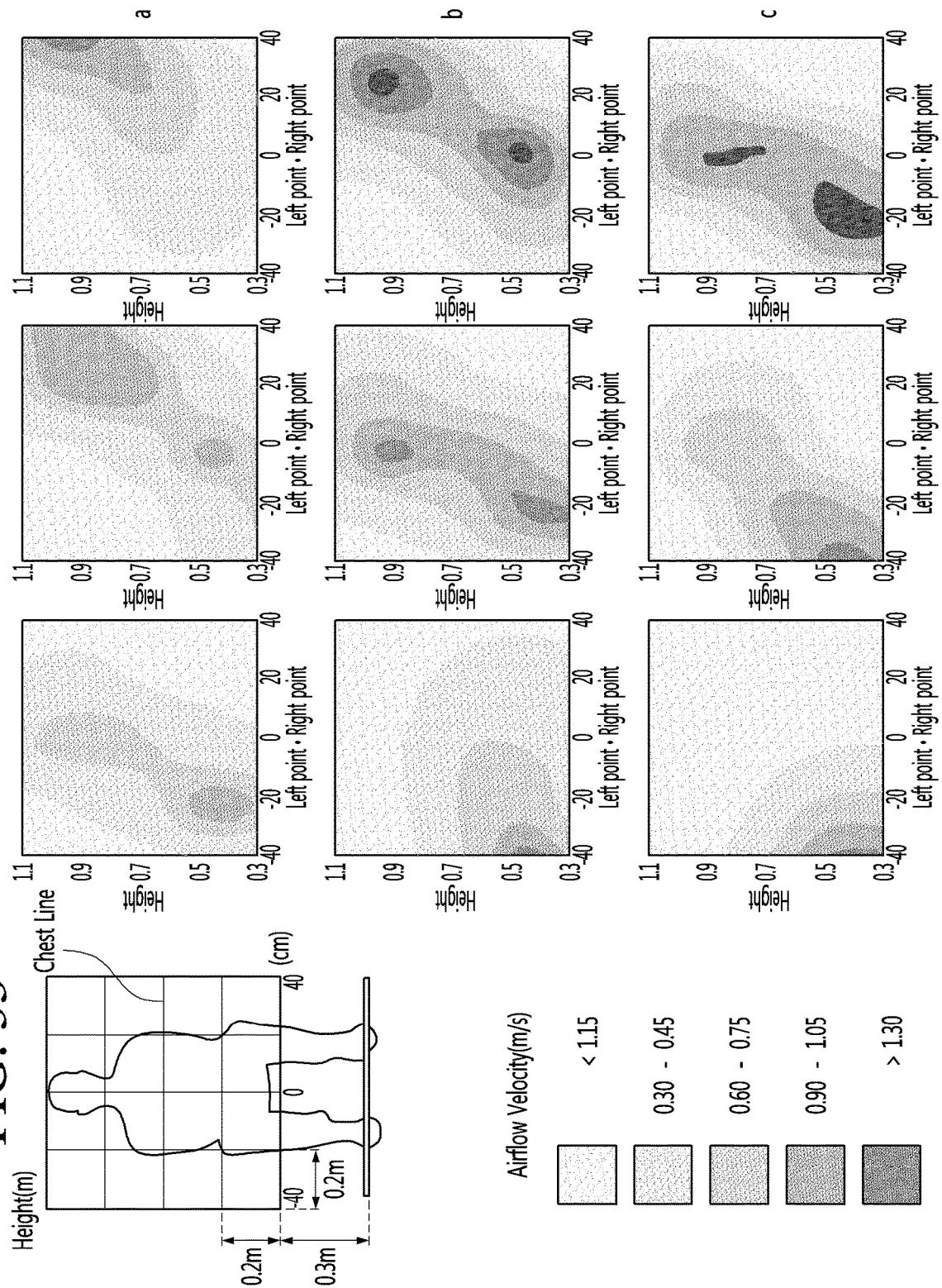
FIG. 33 is an experimental graph illustrating an airflow distribution according to a revolution number (RPM) of each of an upper fan and a lower fan of the flow generator according to an embodiment of the present invention.
Figure 34:
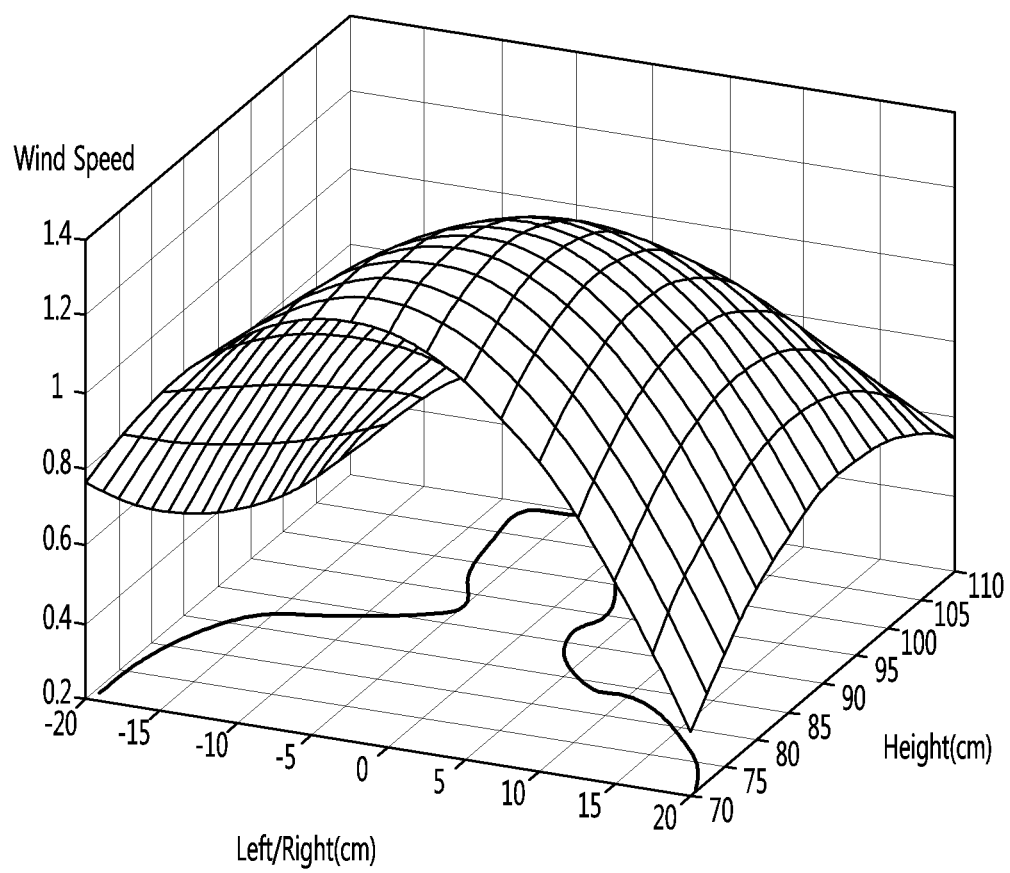
FIG. 34 is a graph of a 3D experiment in which an airflow velocity in the flow generator is measured based on left and right lengths and a height of a user according to an embodiment of the present invention.
Figure 35:
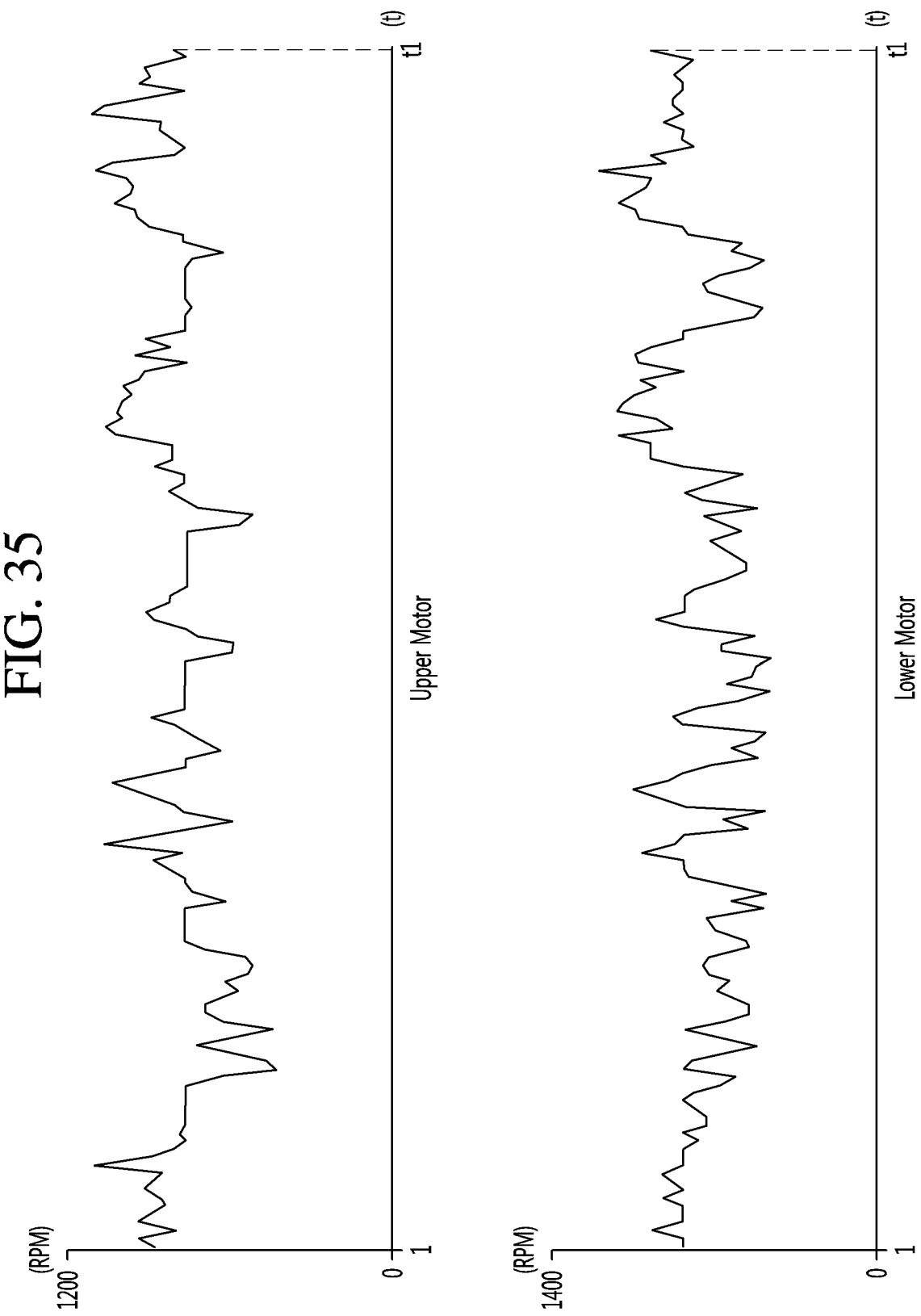
FIG. 35 is a graph illustrating an example of a vertical RPM sequence for generating natural wind in the flow generator according to an embodiment of the present invention.
Figure 36:
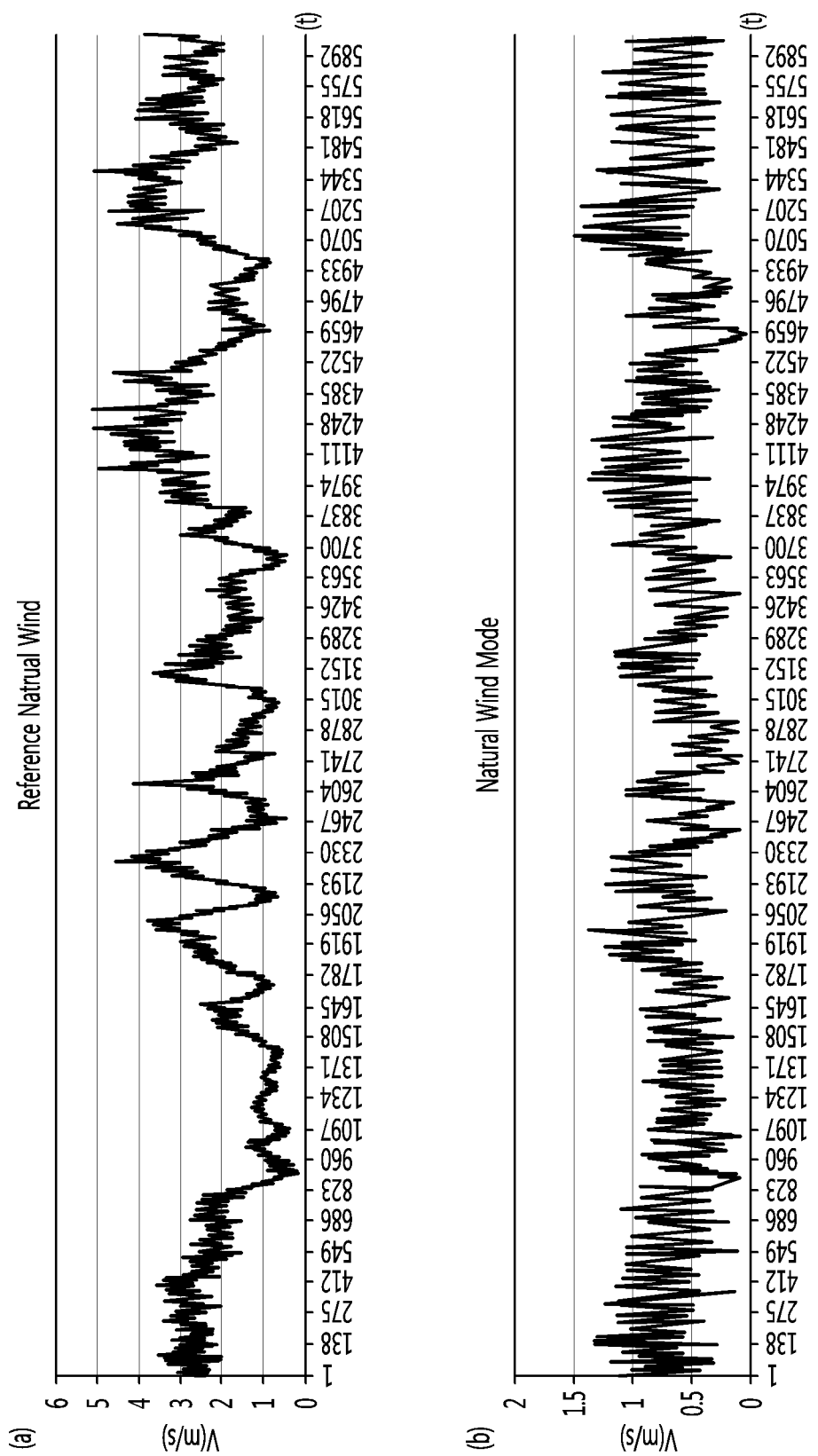
FIG. 36 is an experimental graph for comparing the natural wind in Th flow generator with the time-varying wind speed of the natural wind that is an actual reference according to an embodiment of the present invention.

FIG. 31 is a flowchart illustrating a method for controlling natural wind generation of the flow generator according to an embodiment of the present invention, FIG. 32 is a view illustrating an example of a target graph for generating natural wind in the flow generator according to an embodiment of the present invention, FIG. 33 is an experimental graph illustrating an airflow distribution according to a revolution number of each of an upper fan and a lower fan of the flow generator according to an embodiment of the present invention, FIG. 34 is a graph of a 3D experiment in which an airflow velocity in the flow generator is measured based on left and right lengths and a height of a user according to an embodiment of the present invention, FIG. 35 is a graph illustrating an example of a vertical RPM sequence for generating natural wind in the flow generator according to an embodiment of the present invention, and FIG. 36 is an experimental graph for comparing the natural wind in th flow generator with the time-varying wind speed of the natural wind that is an actual reference according to an embodiment of the present invention.

Referring to FIGS. 31 to 36, a mode for generating natural wind may be input into the flow generator 10 according to an embodiment of the present invention. For example, the control unit 400 receiving a natural mode input signal by user's manipulation may control rotational speeds of the upper fan 130 and the lower fan 230 so as to be changed to a set mode.

When the natural wind mode is input, the control unit 400 may load a previously stored target graph (S2).

The target graph may be defined as a time-varying airflow velocity to which the natural wind characteristics are reflected.

In detail, referring to FIG. 32, the target graph may be defined by measuring the actual airflow velocity of air in a time interval in which a person feels comfortable. For example, actual natural wind of Seoraksan, which is measured in FIG. 32, is a three-dimensional measurement of the natural wind speed component in the time interval A in which the experimenter in the mountain feels comfortable feeling under the condition that the ambient temperature is remained substantially uniformly.

Here, the speed component of the natural wind measured in the time interval A may be processed to remove a high frequency component through a fast fourier transform (FFT).

Also, the graph of the airflow velocity v with respect to the progress time t from which the high frequency component is removed using the FFT may be defined as a target graph and stored in the storage means of the flow generator 10.

In the target graph, the natural wind which gives pleasant feeling to the user is characterized by irregular airflow velocity fluctuation and airflow distribution variation as the time progresses so that the user feels the airflow three-dimensionally.

However, in the flow generator for generating forced flow by the axial flow fan according to the related art, since the airflow velocity and the airflow distribution are changed by only the revolution number of the blade motor and the rotation of the device itself in a state of directly forcing the air-blowing, there is a disadvantage that an airflow pattern is regular, and the airflow also has a regular pattern. Thus, in the natural wind mode, the user may not feel the natural wind, but feel the man-made and artificial wind.

In the flow generator 10 according to an embodiment of the present invention, since the air discharged from the upper fan 130 and the lower fan 230 collides or is mixed with each other and then is discharged (the third airflow) to the user, it may be possible to solve the above-described problem of the conventional forced and direct wind that is provided directly to the user and which causes the artificial wind.

In addition, in the flow generator 10 according to an embodiment of the present invention, the rotational speeds of the upper fan 130 and the lower fan 230 may continuously vary to generate the airflow velocity and the airflow distribution that follow the target graph. In addition, the discharge airflow provided by following the target graph may be irregularly provided to the user.

Thus, the user may feel that the airflow contacting the body thereof is irregular, and the wind blown from the flow generator 10 may be felt as the natural wind.

That is, after the target graph is loaded, the control unit 400 may control a vertical RMP sequence to follow the target graph (S3).

Here, the vertical RPM sequence may be defined as a combination of the rotational speeds of the upper fan 130 and the lower fan 230, which continuously vary to follow the target graph.

Also, in order to extract the vertical RPM sequence, the airflow velocity and airflow distribution detected by the user at the rotational speeds of the upper fan 130 and the lower fan 230 corresponding to Table 1 below may be measured.

TABLE 1

| Rotational speed of upper fan (RPM) | | Rotational speed of lower fan(RPM) | |
|---|---|---|---|
| | | 547 | 906 | 1231 |
| Rotational speed of upper fan (RPM) | 464 | Weak/Weak | Weak/Medium | Weak/Strong |
| | 750 | Medium/Weak | Medium/Medium | Medium/Strong |
| | 1070 | Strong/Weak | Strong/Medium | Strong/Strong |

In Table 1 above, the rotational speeds of the upper fan 130 and the lower fan 230 may be classified into, for example, weak, medium, and strong. For example, the rotational speed of the upper fan 130 may be provided as the weak at 464 rpm, the medium at 750 rpm, and the strong at 1,070 rpm. Also, the rotational speed of the lower fan 230 corresponding to the upper fan may be provided as the weak at 547 rpm, the medium at 906 rpm, and the strong at 1,231 rpm.

Referring to FIG. 33, the measurement results of the airflow velocity and the airflow distribution with a central line of the user's chest line may be confirmed through a graph according to the combination of the rotational speeds of the upper fan 130 and the lower fan 230 shown in Table 1 above. In detail, the airflow distribution of the combination in which the rotational speed of the upper fan 130 is the weak, and the rotational speed of the lower fan 230 is the weak is shown in a horizontal row a and a vertical column ㄱ of FIG. 33.

Referring to FIG. 33, in the flow generator 10 according to an embodiment of the present invention, since air flowing from the upper side to the lower side and then discharged to the first discharge part 25 and air flowing from the lower side to the upper side and then discharged to the second discharge part 27 collide or are mixed with each other so as to be provided to the user, it may be seen that a variety of three-dimensional airflow speeds and airflow distributions are provided according to the combination of rotational speeds of the upper fan 130 and the lower fan 230.

In detail, referring to FIG. 33, in the combination in which the rotational speed of the upper fan 130 is the weak, and the rotational speed of the lower fan 230 is the strong, the airflow may be generated in the right upward direction with respect to the user's chest line. The reason for the generation of the airflow is due to the direction of each air discharged from the upper module 100 and the lower module 200 as described above.

That is, as described above, when the upper air passing through the upper fan 130 rotates in the clockwise direction to move to the first discharge guide part 158, the upper air is guided by a right surface of the first discharge guide part 158 and discharged in the radial direction. Also, when the lower air passing through the lower fan 230 rotates in the counterclockwise direction to move to the second discharge guide part 229, the lower air is guided by a left surface of the second discharge guide part 229 and discharged in the radial direction.

Thus, as the rotational speed (RPM) of the lower fan 230 increases, a stronger airflow may be provided toward an upward right side with respect to the user. As the rotational speed (RPM) of the upper fan 130 increases, a stronger airflow may be provided toward a downward left side with respect to the user.

That is, the flow generator 10 may provide three-dimensional and various airflow speeds and airflow distributions to the user according to the combination of the rotation speeds of the upper fan 130 and the lower fan 230.

Referring to FIG. 34, in order to extract the upper and lower RPM sequences, a three-dimensional (3D) graph obtained by measuring the airflow velocity according to any one of the combinations of the rotational speeds of the upper fan 130 and the lower fan 230, which correspond to Table 1 above.

In detail, in the three-dimensional graph, based on of the user's chest line, left and right lengths are defined as an x-axis, a height is defined as a y-axis, and an airflow velocity is defined as a z-axis. Also, the three-dimensional (3D) graph continuously corresponding to the corresponding airflow velocity according to the left and right lengths and heights of the user may be confirmed.

Here, the airflow velocity outside measurement points may be estimated using B-Spline interpolation.

Also, the airflow velocity measured according to the combination of rotational speeds of the upper fan 130 and the lower fan 230 may be calculated as a mean wind speed above the chest line.

Table 2 below shows the results of the calculation of the airflow velocity three-dimensionally measured according to the combination of the rotational speeds of the upper fan 130 and the lower fan 230, which are exemplarily shown in Table 1, as the mean wind speed.

TABLE 2

| Rotational speed of upper fan/ Rotational speed of lower fan | Mean wind speed above chest line (m/s) |
|---|---|
| 1231/547 | 0.08 |
| 750/547 | 0.13 |
| 464/906 | 0.25 |
| 464/1231 | 0.25 |
| 464/547 | 0.40 |
| 750/1231 | 0.51 |
| 1070/906 | 0.57 |
| 750/906 | 0.66 |
| 1070/1231 | 0.92 |

Referring to FIG. 35, the rotational speeds of the upper fan and the lower fan, which are obtained based on the results of Table 2 above, that is, the upper and lower RPM sequences are exemplarily shown.

That is, in the vertical RPM sequence, the rotational speed (RPM) of each of the upper fan 130 and the lower fan 230, which corresponds to the progress time t is defined so that the target graph is tracked on the basis of the result of calculating the airflow velocity three-dimensionally measured as the mean wind speed.

Also, in the vertical RPM sequence, the combination of the rotational speed (RPM) of the upper fan 130 and the lower fan 230 is defined to continuously vary from a natural wind mode start time to the operation time t1.

Thus, in the vertical RPM sequence, the combination of the rotational speeds of the upper fan 130 and the lower fan 230 may continuously vary according to time to follow the target graph, i.e., realize an airflow equivalent to the target graph.

Thus, the control unit 400 controls the upper fan 130 and the lower fan 230 according to the vertical RPM sequence to generate the discharge airflow of the air generator, to which the airflow velocity and the airflow distribution there-dimensionally vary according to the operation time, i.e., natural wind close to the natural wind (S4).

FIG. 36(a) illustrates a time-varying measurement value of the airflow velocity according to the actual natural wind and FIG. 36(b) illustrates a time-varying measurement value of the airflow velocity, which is provided in the natural wind mode of the flow generator 10.

When comparing FIGS. 36(a) with 36(b), it is confirmed that the natural wind provided by the flow generator 10 according to the embodiment of the present invention is simulated from the actual natural wind in which the user feels comfortable.

Thus, the natural wind discharged from the flow generator 10 may be felt as the natural wind without being felt by the artificial wind so that the user feels more comfortable.

The invention claimed is:

1. A flow generator comprising:
an upper fan configured to suction upper air and generate a first airflow;
an upper fan housing configured to accommodate the upper fan from a lower side thereof and comprising a first discharge part through which the suctioned upper air is discharged;
a lower fan configured to suction lower air and generate a second airflow;
a lower fan housing configured to accommodate the lower fan from an upper side thereof and comprising a second discharge part through which the suctioned lower air is discharged;
an air guide disposed between the upper fan and the lower fan to guide generation of a third airflow in which the first airflow and the second airflow are mixed with each other; and
a control unit configured to control a rotational speed of the lower fan or the upper fan to adjust a discharge direction of the third airflow,
wherein the first discharge part is disposed to face the second discharge part with respect to a flow guide part.

2. The flow generator according to claim 1, wherein the control unit controls the rotational speed of the lower fan or the upper fan so that a flow rate of air passing through the second discharge part is greater than that of air passing through the first discharge part to allow the third airflow to flow toward an upper side of the air guide.

3. The flow generator according to claim 2, wherein the control unit controls the lower fan so that the rotational speed of the lower fan is quicker than that of the upper fan.

4. The flow generator according to claim 1, wherein the control unit controls the rotational speed of the lower fan or the upper fan so that a flow rate of air passing through the first discharge part is greater than that of air passing through the second discharge part to allow the third airflow to flow toward a lower side of the air guide.

5. The flow generator according to claim 4, wherein the control unit controls the upper fan so that the rotational speed of the upper fan is quicker than that of the lower fan.

6. The flow generator according to claim 1, further comprising:
an orifice disposed below the lower fan housing; and
a rotary motor installed in the orifice to provide driving force,
wherein the first discharge part and the second discharge part are rotatable by the driving of the rotary motor.

7. The flow generator according to claim 1, further comprising:
an upper motor connected to the upper fan; and
a lower motor connected to the lower fan,
wherein the control unit controls the number of revolution of the upper motor or the lower motor to adjust a vertical discharge direction of the third airflow.

8. The flow generator according to claim 7, wherein the control unit allows the numbers of revolution of the upper motor and the lower motor to increases or decreases in inverse proportion to each other so that the third airflow is discharged while reciprocating in a vertical direction of the air guide.

9. The flow generator according to claim 1, wherein the control unit allows the rotational speed of the upper fan to increase or decrease at a constant rate within a first set range.

10. The flow generator according to claim 9, wherein the control unit allows the rotational speed of the lower fan to increase or decrease at a constant rate within a second set range.

11. The flow generator according to claim 1, wherein, when the discharge direction of the third airflow is an outward radial direction, the rotational speed of the lower fan is greater than that of the upper fan.

12. The flow generator according to claim 1, wherein the upper fan housing comprises a first guide wall which is disposed to be spaced apart from at least a portion of an outer circumferential surface of the upper fan to provide a first fan passage.

13. The flow generator according to claim 12, wherein the lower fan housing comprises a second guide wall which is disposed to be spaced apart from at least a portion of an outer circumferential surface of the lower fan to provide a second fan passage.

14. The flow generator according to claim 1, wherein the third airflow is generated by allowing the first airflow and the second airflow to collide with each other or to be mixed with each other.

15. The flow generator according to claim 1, wherein the control unit controls the upper fan and the lower fan so that the rotational speeds of the upper fan and the lower fan are continuously changed as time elapses to generate natural wind.

16. A method for controlling a flow generator comprising an upper module suctioning upper air by an upper fan to discharge the air to a first discharge part that is disposed at a lower side, a lower module suctioning lower air by a lower fan to discharge the air to a second discharge part that is disposed at an upper side, and a control unit controlling rotational speeds of the upper fan and the lower fan, the method comprising:
inputting a natural wind mode;
loading a target graph extracted based on data obtained by measuring natural wind; and operating a vertical RPM sequence in which combinations of the rotational speeds of the upper fan and the lower fan are defined so as to follow the target graph.

17. The method according to claim 16, wherein the target graph is obtained by removing a high frequency component from the measured data of the natural wind through fast Fourier transform (FFT).

18. The method according to claim 16, wherein the target graph is defined as a time-varying airflow velocity.

19. The method according to claim 16, wherein the vertical RPM sequence continuously changes the rotational speeds of the upper fan and the lower fan as time elapses so that the airflow velocity detected at a position of a user has a value corresponding to the target graph.

20. The method according to claim 19, wherein the airflow velocity detected at the position of the user comprises a mean wind speed of the airflow velocity corresponding to a left/right length and height of the user.

* * * * *